(12) United States Patent
Inbar

(10) Patent No.: US 8,173,970 B2
(45) Date of Patent: May 8, 2012

(54) DETECTION OF NUCLEAR MATERIALS

(76) Inventor: Dan Inbar, Haifa (IL)

( * ) Notice: Subject to any disclaimer, the term of this patent is extended or adjusted under 35 U.S.C. 154(b) by 19 days.

(21) Appl. No.: 11/348,040

(22) Filed: Feb. 6, 2006

(65) Prior Publication Data

US 2006/0284094 A1    Dec. 21, 2006

Related U.S. Application Data

(60) Provisional application No. 60/649,541, filed on Feb. 4, 2005, provisional application No. 60/651,622, filed on Feb. 11, 2005, provisional application No. 60/654,964, filed on Feb. 23, 2005.

(30) Foreign Application Priority Data

Feb. 6, 2005   (IL) .......................................... 166701

(51) Int. Cl.
    *G01T 3/00*   (2006.01)
(52) U.S. Cl. .................................. 250/390.07
(58) Field of Classification Search .................. 250/359, 250/390.07, 336.1, 358.1
See application file for complete search history.

(56) References Cited

U.S. PATENT DOCUMENTS

| | | | |
|---|---|---|---|
| 2,950,393 A | 8/1960 | Southward |
| 3,076,895 A | 2/1963 | Baldwin |
| 3,381,131 A | 4/1968 | Meal et al. |
| 3,471,414 A | 10/1969 | Faler |
| 3,670,164 A | 6/1972 | Hardy et al. |
| 3,688,113 A | 8/1972 | Miraldi |
| 3,878,373 A | 4/1975 | Blum |
| 3,899,675 A | 8/1975 | Floyd |
| 3,919,557 A | 11/1975 | Berninger |
| 3,935,462 A | 1/1976 | de Luca et al. |
| 3,956,654 A | 5/1976 | Gleason |
| 3,960,756 A | 6/1976 | Noakes |
| 3,970,852 A | 7/1976 | Richey et al. |
| 3,978,337 A | 8/1976 | Nickles et al. |
| 3,988,585 A | 10/1976 | O'neill et al. |
| 4,001,591 A | 1/1977 | Inbar |
| 4,021,670 A | 5/1977 | Noakes |
| 4,045,676 A | 8/1977 | Rolle |
| 4,060,730 A | 11/1977 | Zioni et al. |
| 4,095,108 A | 6/1978 | Inbar et al. |
| 4,100,413 A | 7/1978 | Inbar et al. |
| 4,117,330 A | 9/1978 | Lansiart et al. |
| 4,143,271 A | 3/1979 | Klein et al. |

(Continued)

FOREIGN PATENT DOCUMENTS

CN        1405555       3/2003

(Continued)

OTHER PUBLICATIONS

Slaughter et al. "The"Nuclear Car Wash": A Scanner to Detect Illicit Special Nuclear Material in Cargo Containers", IEEE Sensors Journal, 5(4): 560-564, 2005.

(Continued)

*Primary Examiner* — David Porta
*Assistant Examiner* — Djura Malevic

(57) ABSTRACT

A method for detecting Special Nuclear Materials (SNM) or Radiological dispersion Devices (RDD), comprising: conveying an object along a predetermined path; imaging a distribution of radioactive sources associated with the object as it passes along said path; determining the presence and location of one or both of an RDD or SNM radioactive source within the object.

51 Claims, 20 Drawing Sheets

U.S. PATENT DOCUMENTS

| | | | |
|---|---|---|---|
| 4,149,079 A | 4/1979 | Ben-Zeev et al. | |
| 4,179,664 A | 12/1979 | Bedwell | |
| 4,180,736 A | 12/1979 | Goodman | |
| 4,200,803 A | 4/1980 | Becker et al. | |
| 4,217,497 A | 8/1980 | Daniels et al. | |
| 4,243,886 A | 1/1981 | Untermyer, II | |
| 4,262,203 A | 4/1981 | Overhoff | |
| 4,278,885 A | 7/1981 | von Alfthan et al. | |
| 4,291,227 A * | 9/1981 | Caldwell et al. | 250/328 |
| 4,322,617 A | 3/1982 | Parker | |
| 4,343,994 A | 8/1982 | Farcy | |
| 4,350,607 A | 9/1982 | Apfel | |
| 4,358,682 A | 11/1982 | Telfer et al. | |
| 4,369,495 A | 1/1983 | Inbar et al. | |
| 4,393,307 A | 7/1983 | Nozaki et al. | |
| 4,419,578 A | 12/1983 | Kress | |
| 4,424,446 A | 1/1984 | Inbar et al. | |
| 4,426,580 A | 1/1984 | Smith | |
| 4,429,226 A | 1/1984 | Inbar | |
| 4,432,059 A | 2/1984 | Inbar et al. | |
| 4,434,373 A | 2/1984 | Christ et al. | |
| 4,447,727 A | 5/1984 | Friesenhahn | |
| 4,455,616 A | 6/1984 | Inbar | |
| 4,476,391 A | 10/1984 | Bednarczyk | |
| 4,481,421 A | 11/1984 | Young et al. | |
| 4,493,811 A | 1/1985 | Seki et al. | |
| 4,498,007 A | 2/1985 | Schwarzmann | |
| 4,509,042 A | 4/1985 | Kruse | |
| 4,543,485 A | 9/1985 | Ishii et al. | |
| 4,568,510 A | 2/1986 | Caldwell | |
| 4,573,122 A | 2/1986 | Inbar et al. | |
| 4,580,057 A | 4/1986 | Sidhwa | |
| 4,582,670 A | 4/1986 | Leon et al. | |
| 4,588,897 A | 5/1986 | Inbar et al. | |
| 4,588,898 A | 5/1986 | Piesch et al. | |
| 4,598,202 A | 7/1986 | Koechner | |
| 4,613,313 A | 9/1986 | Steele | |
| 4,620,100 A | 10/1986 | Schoenig, Jr. et al. | |
| 4,622,466 A | 11/1986 | Tamura | |
| 4,638,158 A | 1/1987 | Sonne et al. | |
| 4,731,535 A | 3/1988 | Rische et al. | |
| 4,823,016 A | 4/1989 | Yamashita et al. | |
| 4,841,153 A | 6/1989 | Wormald | |
| 4,864,140 A | 9/1989 | Rogers et al. | |
| 4,866,277 A | 9/1989 | Johnson et al. | |
| 4,870,280 A | 9/1989 | Yamashita et al. | |
| 4,937,452 A | 6/1990 | Simpson et al. | |
| 5,034,610 A | 7/1991 | Spacher et al. | |
| 5,041,728 A | 8/1991 | Spacher et al. | |
| 5,078,951 A | 1/1992 | August, Jr. | |
| 5,083,026 A | 1/1992 | Elbaum | |
| 5,155,366 A | 10/1992 | Miller | |
| 5,204,527 A | 4/1993 | Buchanan | |
| 5,315,506 A | 5/1994 | Wang et al. | |
| 5,317,158 A | 5/1994 | Mcelhaney et al. | |
| 5,326,974 A | 7/1994 | Karras et al. | |
| 5,345,084 A | 9/1994 | Byrd | |
| 5,440,135 A | 8/1995 | Shonka | |
| 5,457,720 A | 10/1995 | Snyder et al. | |
| 5,517,030 A | 5/1996 | Nabais Conde et al. | |
| 5,532,122 A | 7/1996 | Drukier | |
| 5,638,420 A * | 6/1997 | Armistead | 378/57 |
| 5,675,151 A | 10/1997 | Oka et al. | |
| 5,692,029 A * | 11/1997 | Husseiny et al. | 378/88 |
| 5,721,759 A | 2/1998 | Raatikainen | |
| 5,734,689 A | 3/1998 | Copeland et al. | |
| 5,738,895 A | 4/1998 | Fuchs et al. | |
| 5,753,919 A | 5/1998 | Prain et al. | |
| 5,780,856 A | 7/1998 | Oka et al. | |
| 5,821,541 A | 10/1998 | Tumer | |
| 5,838,759 A | 11/1998 | Armistead | |
| 5,854,489 A | 12/1998 | Verger et al. | |
| 5,880,469 A | 3/1999 | Miller | |
| RE36,201 E | 4/1999 | Miller | |
| 6,006,162 A | 12/1999 | Haywood | |
| 6,076,009 A | 6/2000 | Raylman et al. | |
| 6,087,663 A | 7/2000 | Moisan et al. | |
| 6,111,257 A | 8/2000 | Shand et al. | |
| 6,120,706 A | 9/2000 | Lessing et al. | |
| 6,134,289 A | 10/2000 | Peurrung et al. | |
| 6,149,593 A | 11/2000 | Gonzalez-Lepera | |
| 6,169,285 B1 | 1/2001 | Petrillo et al. | |
| 6,175,120 B1 | 1/2001 | Mcgregor et al. | |
| 6,184,531 B1 | 2/2001 | Smart et al. | |
| 6,194,726 B1 | 2/2001 | Pi et al. | |
| 6,201,257 B1 | 3/2001 | Stettner et al. | |
| 6,201,530 B1 | 3/2001 | Thadani et al. | |
| 6,225,634 B1 | 5/2001 | Atrashkevich et al. | |
| 6,228,664 B1 | 5/2001 | Bronson et al. | |
| 6,255,655 B1 | 7/2001 | Mc Croskey et al. | |
| 6,255,657 B1 | 7/2001 | Cole et al. | |
| 6,256,373 B1 | 7/2001 | Bernstein et al. | |
| 6,271,510 B1 | 8/2001 | Boxen | |
| 6,285,028 B1 | 9/2001 | Yamakawa | |
| 6,297,506 B1 | 10/2001 | Young et al. | |
| 6,298,113 B1 | 10/2001 | Duclos et al. | |
| 6,300,635 B1 | 10/2001 | Brambilla et al. | |
| 6,341,150 B1 | 1/2002 | Ivanov et al. | |
| 6,362,477 B1 | 3/2002 | Sowerby et al. | |
| 6,362,485 B1 | 3/2002 | Joyce et al. | |
| 6,369,393 B1 | 4/2002 | Jordanov | |
| 6,380,540 B1 | 4/2002 | Maor et al. | |
| 6,380,541 B1 | 4/2002 | Laine et al. | |
| 6,388,260 B1 | 5/2002 | Doty et al. | |
| 6,420,710 B1 | 7/2002 | Verger et al. | |
| 6,423,972 B1 | 7/2002 | Fehrenbacher et al. | |
| 6,448,560 B1 | 9/2002 | Tumer | |
| 6,452,992 B1 | 9/2002 | Umiastowski | |
| 6,456,869 B1 | 9/2002 | Raylman et al. | |
| 6,486,468 B1 | 11/2002 | Lacy | |
| 6,509,563 B1 | 1/2003 | McElroy, Jr. et al. | |
| 6,519,306 B1 | 2/2003 | Matsumiya | |
| 6,544,442 B1 | 4/2003 | Bell et al. | |
| 6,596,998 B1 | 7/2003 | Siedel | |
| 6,603,122 B2 | 8/2003 | Taleyarkhan | |
| 6,603,124 B2 | 8/2003 | Maublant | |
| 6,610,977 B2 | 8/2003 | Megerle | |
| 6,624,415 B1 | 9/2003 | Hattori et al. | |
| 6,723,996 B2 | 4/2004 | Lebrun et al. | |
| 6,806,475 B1 * | 10/2004 | Lightfoot et al. | 250/395 |
| 6,822,235 B2 | 11/2004 | Ryden | |
| 6,876,711 B2 | 4/2005 | Wallace et al. | |
| 6,906,559 B2 | 6/2005 | Tumer | |
| 6,944,264 B2 * | 9/2005 | Bijjani et al. | 378/57 |
| 6,989,541 B2 | 1/2006 | Penn | |
| 6,992,313 B2 | 1/2006 | Piestrup | |
| 7,026,627 B2 | 4/2006 | Fowler et al. | |
| 7,049,603 B2 * | 5/2006 | Martoff | 250/390.02 |
| 7,151,815 B2 * | 12/2006 | Ruddy et al. | 376/158 |
| 7,317,195 B2 * | 1/2008 | Eikman | 250/484.5 |
| 7,366,282 B2 * | 4/2008 | Peschmann | 378/57 |
| 7,369,640 B2 | 5/2008 | Seppi et al. | |
| 7,521,686 B2 | 4/2009 | Stuenkel et al. | |
| 7,847,260 B2 | 12/2010 | Inbar | |
| 2001/0048730 A1 | 12/2001 | Oshima et al. | |
| 2002/0036270 A1 | 3/2002 | Tumer | |
| 2002/0067789 A1 | 6/2002 | Wallace et al. | |
| 2002/0125429 A1 | 9/2002 | Lebrun et al. | |
| 2002/0175288 A1 | 11/2002 | Taleyarkhan | |
| 2003/0006376 A1 | 1/2003 | Tumer | |
| 2003/0015655 A1 | 1/2003 | Ryden | |
| 2003/0081724 A1 | 5/2003 | Piestrup | |
| 2003/0111611 A1 | 6/2003 | Maublant | |
| 2003/0116713 A1 | 6/2003 | Cooke et al. | |
| 2003/0165211 A1 | 9/2003 | Grodzins et al. | |
| 2003/0189510 A1 | 10/2003 | Anderton et al. | |
| 2003/0197128 A1 | 10/2003 | Tumer | |
| 2003/0205677 A1 * | 11/2003 | Caldwell et al. | 250/395 |
| 2003/0226971 A1 * | 12/2003 | Chandross et al. | 250/361 R |
| 2004/0000645 A1 | 1/2004 | Ramsden et al. | |
| 2004/0051044 A1 | 3/2004 | Bjurman et al. | |
| 2004/0109532 A1 * | 6/2004 | Ford et al. | 378/57 |
| 2004/0200966 A1 | 10/2004 | Ramsden | |
| 2004/0251419 A1 * | 12/2004 | Nelson et al. | 250/370.09 |
| 2005/0006589 A1 | 1/2005 | Joung et al. | |
| 2005/0011849 A1 | 1/2005 | Chattey | |
| 2005/0017181 A1 * | 1/2005 | Kearfott et al. | 250/361 R |

| | | | |
|---|---|---|---|
| 2005/0021233 | A1 | 1/2005 | Christensen |
| 2005/0253073 | A1 | 11/2005 | Joram et al. |
| 2005/0263711 | A1 | 12/2005 | Geri et al. |
| 2005/0275545 | A1* | 12/2005 | Alioto et al. .................. 340/600 |
| 2006/0011849 | A1 | 1/2006 | Tseng et al. |
| 2006/0017000 | A1* | 1/2006 | Martoff .................... 250/390.02 |
| 2006/0049357 | A1 | 3/2006 | Tumer |
| 2006/0081782 | A1 | 4/2006 | Guillebaud et al. |
| 2006/0102845 | A1 | 5/2006 | Williams et al. |
| 2006/0219932 | A1* | 10/2006 | Fellerman et al. ............ 250/393 |
| 2006/0289775 | A1 | 12/2006 | Inbar |
| 2007/0102646 | A1* | 5/2007 | Goldberg ................. 250/390.01 |
| 2007/0187608 | A1 | 8/2007 | Beer et al. |
| 2007/0205373 | A1* | 9/2007 | Kornblau et al. ........ 250/390.12 |
| 2007/0210255 | A1* | 9/2007 | Bjorkholm ................. 250/358.1 |
| 2007/0278423 | A1* | 12/2007 | Eikman ...................... 250/484.5 |
| 2008/0023631 | A1* | 1/2008 | Majors et al. ............. 250/336.1 |
| 2008/0067390 | A1 | 3/2008 | Ramsden et al. |
| 2008/0135772 | A1* | 6/2008 | Claus et al. ............. 250/390.01 |
| 2008/0175351 | A1* | 7/2008 | Norman et al. ................. 378/53 |
| 2011/0012021 | A1 | 1/2011 | Inbar |

FOREIGN PATENT DOCUMENTS

| | | |
|---|---|---|
| DE | 10149888 | 3/2003 |
| EP | 0003811 | 5/1979 |
| EP | 0060574 | 9/1982 |
| EP | 1026522 | 8/2000 |
| JP | 54-082275 | 6/1979 |
| JP | 54082275 | 6/1979 |
| JP | 61-060595 | 3/1986 |
| JP | 61-149884 | 7/1986 |
| JP | 61149884 | 7/1986 |
| RU | 2129289 | 4/1999 |
| RU | 2150127 | 5/2000 |
| RU | 2150693 | 6/2000 |
| RU | 2158938 | 11/2000 |
| RU | 2161299 | 12/2000 |
| RU | 2191408 | 10/2002 |
| RU | 2196980 | 1/2003 |
| WO | WO 99/03155 | 1/1999 |
| WO | WO 99/22251 | 6/1999 |
| WO | WO 03/048815 | 6/2003 |
| WO | WO 2004/051311 | 6/2004 |
| WO | WO 2004/061448 | 7/2004 |
| WO | WO 2004/092719 | 10/2004 |

OTHER PUBLICATIONS

Prussin et al. "Nuclear Car Wash Status Report", Lawrence Livermore National Laboratory: 1-85, 2005.
Slaughter et al. "Detection of Special Nuclear Material in Cargo Containers Using Neutron Interrogation", Lawrence Livermore National Laboratory, 1-63, 2003.
Official Action Dated Aug. 5, 2009 From the US Patent and Trademark Office Re.: U.S. Appl. No. 11/690,150.
Official Action Dated Dec. 10, 2009 From the US Patent and Trademark Office Re.: U.S. Appl. No. 11/463,112.
Response Dated Dec. 3, 2009 to Official Action of Aug. 5, 2009 From the US Patent and Trademark Office Re.: U.S. Appl. No. 11/690,150.
Response Dated Jan. 26, 2010 to Official Action of Dec. 10, 2009 From the US Patent and Trademark Office Re.: U.S. Appl. No. 11/463,112.
Supplemental Response Dated Jan. 26, 2010 to Response of Dec. 3, 2009 to Official Action of Aug. 5, 2009 and to Interview Summary of Jan. 7, 2010 From the US Patent and Trademark Office Re.: U.S. Appl. No. 11/690,150.
Official Action Dated Jul. 24, 2008 From the US Patent and Trademark Office Re.: U.S. Appl. No. 11/463,112.
Official Action Dated May 1, 2009 From the US Patent and Trademark Office Re.: U.S. Appl. No. 11/463,112.
Response Dated Jan. 26, 2010 to Official Action of Oct. 27, 2009 From the US Patent and Trademark Office Re.: U.S. Appl. No. 11/348,040.
Notice of Allowance Dated Mar. 26, 2010 From the US Patent and Trademark Office Re.: U.S. Appl. No. 11/690,150.
Official Action Dated May 27, 2010 From the US Patent and Trademark Office Re.: U.S. Appl. No. 11/463,112.
Response Dated Jul. 21, 2010 to Official Action of May 27, 2010 From the US Patent and Trademark Office Re.: U.S. Appl. No. 11/463,112.
Official Action Dated Sep. 15, 2010 From the US Patent and Trademark Office Re.: U.S. Appl. No. 11/690,150.
Response Dated Sep. 26, 2010 to Official Action of Sep. 15, 2010 From the US Patent and Trademark Office Re.: U.S. Appl. No. 11/690,150.
Official Action Dated May 27, 2011 From the US Patent and Trademark Office Re. U.S. Appl. No. 12/860,973.
Official Action Dated Jan. 5, 2011 From the US Patent and Trademark Office Re. U.S. Appl. No. 12/860,973.
Official Action Dated Mar. 30, 2011 From the US Patents and Trademark Office Re. U.S. Appl. No. 12/038,950.
Response Dated Feb. 28, 2011 to Official Action of Jan. 5, 2011 From the US Patent and Trademark Office Re. U.S. Appl. No. 12/860,973.
Prussin et al. "Nuclear Car Wash Status Report, Aug. 2005", Lawrence Livermore National Laboratory, UCRL-TR-214636, p. 1-85, Aug. 16, 2005.
Slaughter et al. "Detection of Special Nuclear Material in Cargo Containers Using Neutron Interrogation", Lawrence Livermore National Laboratory, UCRL-ID-155315, p. 1-63, Aug. 2003.
Amendment After Allowance Dated Nov. 30, 2011 From the US Patent and Trademark Office Re. U.S. Appl. No. 12/860,973.
Response Dated Aug. 29, 2011 to Official Action of May 27, 2011 From the US Patent and Trademark Office Re. U.S. Appl. No. 12/860,973.
Notice of Allowance Dated Nov. 17, 2011 From the US Patent and Trademark Office Re. U.S. Appl. No. 12/860,973.

* cited by examiner $\Theta(t) = f[A; X(t)]$

DETECTION OF NUCLEAR MATERIALS

RELATED APPLICATIONS

This application claims the benefit under 35 U.S.C. §1.19(e) of U.S. provisional applications 60/649,541 "Nuclear Radiological Threats Screening Portals," filed: Feb. 4, 2005; 60/651,622 "SNM and RDD Screening Portals," filed: Feb. 11, 2005; and 60/654,964 "Advanced SNM and RDD Screening Portals", filed Feb. 23, 2005. The disclosures of each of these applications is incorporated herein by reference.

FIELD OF THE INVENTION

The present application is generally concerned with detection of nuclear materials.

BACKGROUND OF THE INVENTION

Nuclear-Radiological (hereunder occasionally referred to as "nuc/rad" or SNM/RDD) Threat Screening Portals have been developed starting with the Manhattan project (1942-1946). These systems were developed mainly to ensure workplace and product safety in the nuclear industry with its estimated 1,000 nuclear facilities worldwide and in the scrap metal industry.

Since the early 1990s, industry and national labs worldwide expanded research efforts to modify existing screening systems so they can detect illicit trafficking of nuclear-radiological materials, nuclear devices and RDD (Radiological Dispersal Device) as well.

The present invention relates generally to Special Nuclear Materials (SNM) and Radiological Dispersion Devices (RDD) Screening Portals (NRSP).

An extensive review of the prior art is given in U.S. provisional application 60/654,964 referred to in the related applications section and incorporated herein by reference. Nearly all the systems described in the Prior Art chapter do not meet, to a great extent, the challenge of detecting many nuclear/radiological threats. Furthermore, existing Nuclear-Radiological Threat Detection Portals have a more limited detection performance in terms of overlooked nuc/rad threat detection and false alarm rate against sophisticated terror-related attacks and trafficking that homeland security authorities would like to intercept in the post 9/11 period.

To better understand Nuclear/Radiological Portals technologies, two prior art examples of checkpoint operational flow charts (see FIGS. 1 and 2) are presented. These demonstrate a typical process implemented when a person or a parcel or a shipment, or a vehicle or other conveyance (such as a boat or train) with a nuclear-radiological threat passes through a nuclear-radiological detection portal.

As shown in FIG. 1, the process entails a rather complex and expensive multi-stage screening procedure that results either in an "all clear" decision by the portal supervisors or in seizure of the cargo (or person) by the relevant authorities.

The security forces (or Hazmat, NEST teams, first-responders, or nuclear regulatory, law enforcement bodies) operational flow chart is shown in FIG. 1. This is a generalized flow chart that delineates the complex inter-relation between the technical aspects of detection at a checkpoint (e.g., NEST, border or roadside checkpoint) and the various organizations involved (e.g., nuclear experts, police) once a suspected item turns the alarm on.

The local supervisor of a nuclear/radiological portal has a different procedure to follow (see FIG. 2). The main mission is to reconcile three conflicting demands:

Detect "all" nuclear/radiological threats
Reduce false alarms to a minimum
Enable uninterrupted traffic flow
Prior Art nuclear/radiological portals encounter several difficulties that limit their detection performance:
  Natural background radiation (NORM). Prior art detectors are generally not collimated, in order to have a large field of view encompassing more possible threats. Since their field of view often approaches 180°, they detect a large amount of radiation (for example, environmental radiation, cargo scatter and other sources) from sources spatially remote from the loci of threats.
  Radiation emanating from benign sources, for example goods which have NORM, medical isotopes and industrial isotopes.
  SNM (Special Nuclear Materials)—Weapon grade uranium (WgU) and plutonium WgP) emit a low rate of gamma rays and neutrons. This makes it difficult to detect them (especially when shielded).
  Limited sensitivity of detection.
  Radiation sources concealed in "radiation-shielded" means (e.g., lead and/or cargo and or neutron moderators) which attenuate the detected activity of gamma and neutron particles.

Natural environmental background radiation can impede the detection of low activity and/or shielded SNM/RDD threats, and it is also a potential source of false alarms. Natural background radiation emanates from both cosmic and terrestrial radiation. Natural background radiation level (FIGS. 3 and 4) depends on a variety of uncontrolled factors, such as geographic location, ground level, masking by passing objects like vehicles, rain and the random nature of such radiation.

To reduce the effects of environmental background radiation, various algorithms and nuclear electronic means are currently used, designed to detect low intensity radiation threats while keeping random false alarms at an acceptable level. To further reduce background radiation, the system's detectors are lead-shielded on the sides that do not face the object under screening.

As indicated above, radiation emanating from benign sources might cause false alarms. There are two distinct groups of benign radiation sources that may cause false alarms:
  Nuclear medicine isotopes, and patients who were the recipients of such isotopes.
  Benign commercial goods and materials.
  Normally occurring radioactive materials and other background radiation (NORM). Some of these are further discussed in the following sections.

Nuclear Medicine Radiopharmaceuticals

Every year, about 40 million patients worldwide (including about 17 million in the U.S.) undergo some type of a nuclear medicine procedure. Most radio pharmaceutics in use decay within 5-10 days. During this period, such patients and/or the benign delivery of radio pharmaceutics may trigger a false alarm in nuclear/radiological portals.

The following isotopes comprises of >98% of all clinical procedures in nuclear medicine: Gallium-67; Technetium-99m; Thallium-201; Iodine-123; Iodine-125; Iodine-131; Xenon-133; and Indium-111

Note: $Tc^{99}$ (140 Kev) constitutes more than 85% of all nuclear medicine applications. $Tc^{99}$ has a half-life (rate of decay) of 6 hours. Note that there are more isotopes used in NM not listed in the table.

At any given time, in North America alone, it is estimated that approximately one in 2,500 people emit gamma radiation that may trigger an alarm at a nuclear/radiological portal, unless advanced identification means and methods are used to detect and screen out such cases.

Benign Materials and Goods Containing Natural Radioactivity (Norm)

Many benign goods emit radioactive radiation. The most frequent naturally occurring radio nuclides are $K^{40}$, natural $U^{226}$, $Ra^{226}$ and natural $Th^{232}$.

Table 1 below shows the typical natural activity emission in [Bq/Kg]

TABLE 1

Benign Materials Containing Naturally Occurring Radioactivity

| Substance | Typical Activity Concentration in Bq/Kg⁻ | | |
|---|---|---|---|
| | $K^{40}$ | $Ra^{226}$ | $Th^{232}$ |
| Adobe | 200-2000 | 10-100 | 20-200 |
| Concrete | 100-500 | 30-60 | 30-50 |
| Feldspar | 1500-5000 | 30-100 | 50-200 |
| Fertilizers | 30-10000 | 10-1000 | 10-40 |
| Granite | 500-5000 | 25-500 | 30-100 |
| Marble | 30-200 | 10-40 | 15-30 |
| Monazite Sand | 30-100 | 20-1000 | 40-4000 |
| Sandstone | 1000 | 10-100 | 10-100 |
| Slate | 500-1000 | 20-80 | 30-80 |

It is known that common goods, like: decorated glass, dental ceramics, marijuana, polishing powder, bananas, consumer goods lenses, and Thorium glass compounds, may trigger an alarm at a nuclear/radiological portal. To date, the preferred technology to reduce false alarms emanating from benign sources is to use Gamma spectroscopy that identifies some benign isotopes. Most presently deployed portals do not include such means, due to cost considerations. Those that do, use only such means for gamma identification.

In order to identify a threat, a sufficient number of neutron and/or Gamma particles must interact with a portal's detectors and be recorded by the system electronics. This requires a high sensitivity detection medium (e.g., G.M. counters have a much lower sensitivity than scintillation crystals), and a close proximity between the detectors and the item under surveillance (e.g., vehicle, enclosure).

Nuclear Gamma radiation is absorbed by high Z materials (e.g., lead, steel). Neutrons are attenuated by low Z elements (e.g. water). It must be assumed that terrorists may attempt to "shield" nuclear/radiological threats in a radiation-absorbing "enclosure".

Highly Enriched Uranium (HEU) Special Nuclear Materials (SNM) detection poses a substantial challenge, since HEU emits a very low rate of spontaneous fission, neutrons, and most of the gamma emission is at low energy which is easily attenuated by cargo and shields.

In order to detect some types of shielding it is possible to develop an electro-magnetic metal detector that will have high detection efficiency for uranium, lead, and plutonium detection. There are currently at least two companies that offer a link to an optional metal detector.

Weapons-Grade Plutonium (WgP) Detection

The leading detection means for weapons-grade plutonium are neutron detectors (e.g., $He^3$, glass fiber). This is due to three properties:

1. Low natural neutron background radiation
2. Relatively high flux of neutrons (950-200 neutrons per kg per sec)

Weapons-Grade Uranium (WgU) Detection

The leading prior art means of detecting WgU is by detecting the gamma emission of WgU. $U^{235}$ emits some 1.01 MeV gamma rays and reactor recycled WgU includes traces of $U^{232}$ which via its $Tl^{206}$ product emits 2.6 MeV gamma rays.

Due to its low rate of spontaneous fission neutrons, neutron detection is not used in the prior art to detect WgU.

Detection of "Radiation Dispersal Devices" (RDD)—Prior Art Technologies

For SNM-based RDD, the same technologies used for SNM detection are used.

For gamma-emitting radioisotopes RDDs (e.g., $Co^{60}$, $Cs^{137}$), the main obstacles to detection are:

1. Potential lead shielding (which is fairly easy to implement for isotope energies below 500 KeV).
2. Nuclear medicine (N.M.) and NORM false alarms (note that 99% of N.M. isotopes are in the 80-300 KeV range).

Propr Art Radiation Detectopm Portal Description—By Technology and Application

To assist in focusing on the relevant Prior Art, we will describe here Prior Art technologies from two different perspectives:

1) Current Core Detection Technologies segments:
   Gamma Detectors
   Neutron Detectors
   Neutron Activation Detection
2) Detection Systems By Application:
   People Screening Portals
   Train Screening Portals
   Vehicle Screening Portals
   Enclosure Screening Cranes
   Parcels & Packages Comparison of Prior Art Nuclear/Radiological Portals Core (Detection) Technologies FIG. 5 provides a roadmap of the various core passive detection technologies currently used to detect nuclear radiological materials and devices trafficking.

There are two classes of detection technologies:

Direct radiation detectors—These detectors convert radiation particles energy directly into electrically-charged impulses that are processed by the system's electronics (e.g., HPG, Geiger counters and He3 proportional counters, CZT).

Scintillators—This subgroup of detectors (e.g., organic and inorganic scintillators) functions in two steps: the energy of the particles is converted into light (photon). The flash of light scintillation is picked-up and converted into an electrical impulse by a photo detector (e.g., photomultiplier).

The following Table 2 describes some of the more important aspects distinguishing each of the detectors used in nuclear/radiological portals.

The two tables below (Tables 2 and 3) illustrate the reason most portal designers elected in the past to use plastic scintillators for Gamma-only portals, and $He^3$ filled detectors for Neutron detection, since these two detection means provide optimal cost-performance for systems developed. At present the leading spectroscopy based portals detectors are NaI(T1) and HPG. In the following tables, 1 is poor, 5 is excellent.

TABLE 2

Prior Art Radiation Detection Technologies - Major Properties Comparison

| Technology | Cost | Energy Resolution | Stopping Power | Isotope I.D. |
|---|---|---|---|---|
| Geiger Counters | 5 | No | 1 | No |
| Plastic Scintillators | 5 | 0 to 1 | 2 | No |
| NaI (Ti), CsI(TI), BGO Scintillators: Isotope I.D. Mode | 1 | 4 | 4 | 3 |
| He3 Detector | 2 | 2 | 3 | 3 |
| Proportional He$^3$ Detector Array | 3 | 2 | 4 | 3 |
| Neutron "Glass Detectors" | 3 | 2 | 3 | 3 |
| Neutron Activation Plutonium & HEU Detection & Imaging | Very High Cost | N/A | 5 | 5 |

Two typical configurations of Geiger tube portals are shown in FIG. 6. Such portals were developed in the early 1950's for nuclear safety applications. Since in safety applications any detection of radiation (above a background level) should trigger an alarm, it exhibited satisfactory cost performance.

At present, only a handful of security portals use Geiger detectors.

TABLE 3

Geiger Counters - Advantages and Disadvantages

| Advantages | Disadvantages |
|---|---|
| Extremely low cost | Poor sensitivity (low Z results in limited stopping power) |
| Simple and low cost electronics | High rate of false alarms |
| Proven technology | Poor detection of high energy (e.g., Co$^{60}$) radiation sources |
| Simple maintenance | Limited Count Rate Performance |

Large (2-5 cm thick) slabs of plastic scintillators blocks are the primary detector used extensively in nuclear/radiological portals.

Various plastic materials such as Anthracene emit extremely short (2-5 nanoseconds) scintillations of light when Alpha, Beta, Neutron or Gamma particles interact with the plastic molecule (via a photoelectric and multiple Compton effects). These short light scintillation are picked up and amplified by a photomultiplier tube (FIG. 8).

The "train" or string of impulses is further amplified by a low-noise amplifier and the pulse is registered by digital electronics (not shown). When the rate surpasses the rate of Normal Background Radiation (NBR) at a statistically meaningful level, an alarm is triggered.

The prior art thinking is that since plastic scintillators do not provide energy resolution and thus cannot provide spectroscopy isotope ID, such detectors result in a high rate of false and nuisance alarms.

In spite of their inherent limitations (see Table 4), plastic scintillators are used extensively in present-day nuclear/radiological portals, mainly due to the low cost of large volume (5-50 liter) plastic scintillators as detectors without effective energy resolution.

TABLE 4

Plastic Scintillators - Advantages and Disadvantages

| Advantages | Disadvantages |
|---|---|
| Proven technology | High rate of false alarms |
| Ease of fabrication in various shapes and volumes | Requires periodic calibration |
| Robust Material | High rate of overlooked threats |
| Low cost | No energy spectroscopy |
| Simple to maintain | |

Scintillation (Inorganic) Crystals (e.g., NaI (Ti), CsI (TI), BGO)

When Gamma particles interact with a mono-crystalline scintillator material, ionized (excited) atoms in the scintillator material "relax" to a lower-energy state and in the process emit a scintillation of photons. In a scintillator crystal, the return of the atom to lower-energy states with the emission of photons is an inefficient process. Furthermore, the emitted photons usually have a high energy which generates photons that do not lie in the range of wavelengths to which the PMT is sensitive. To enhance the emission of visible photons, small amounts of impurities (called activators) are added to most scintillators. The crystal's de-excitations, channeled through these impurities, give rise to photons that activate the PMT (see FIG. 8).

The light pulses are converted to an electrical impulse and amplified by the photomultiplier and a low noise amplifier. As the intensity of each pulse is proportional to the Gamma energy of the primary particles, a threshold device is inserted to reject low energy background radiation.

The most popular scintillators used in nuc/rad portals are:
NaI (T1)—Sodium Iodide Thallium activated crystals
BGO—Bismuth—Germanium—Oxygen Crystals

TABLE 5

Inorganic Scintillators - Advantages and Disadvantages

| Advantages | Disadvantages |
|---|---|
| Proven technology | Limited sensitivity - due to use of small detectors |
| Upgradeable to provide Isotope I.D. | Sensitive to Environmental Conditions |
| | High Cost |

NaI (TI), CsI (Ti), BGO Scintillators & Isotope Spectroscopic I.D.

These scintillation crystals have a moderate energy resolution (5%-14% depending on scintillator type and energy), enabling the addition of isotope I.D. electronics, reducing the false alarm rate dramatically.

By digitizing each impulse (via an A/D converter) and sorting it in a spectrometer, for example a multi-channel analyzer, an I.D. of the radioisotope can be achieved (FIG. 9).

For example, if the spectrometer reading shows that the Gamma source energy is at 140 KeV±3%, then the portal threat identification can assume that this is a benign radiation of Tc$^{99}$ used routinely in nuclear medicine.

TABLE 6

NaI (TI), CsI (Ti), BGO Scintillators & Isotope I.D. (Multi-Channel Analyzer) - Advantages and Disadvantages

| Advantages | Disadvantages |
|---|---|
| Proven technology | Low sensitivity |
| Spectroscopic Isotope I.D | Sensitive to ambient temperature |
| | High cost |

He³ Neutron Detectors

The main function of neutron detectors in nuclear/radiological portals is to detect WgP.

Neutrons have no electrical charge but have a considerable mass. As such, they cannot produce an electrical charge (ionization) directly. Neutron detection relies on the interaction of neutrons with matter. Such an interaction produces a secondary charged particle with a charge proportional to the original neutron energy (this is why such detectors are called "Proportional Detectors").

There are many alternative designs of He³ neutron detectors, but all of them comprise a metal enclosure filled with He³ gas (FIG. 10), two electrodes (anode and cathode) and charge detection electronics (the reaction used is indicated as $n+He^3 \rightarrow P+He^3+765$ KeVs).

Neutron detectors are efficient for low-energy neutrons (Thermal Neutrons) and inefficient for the detection of high energy ("fast") neutrons. Because of this phenomena "moderators" that "slow down" the fast neutrons are used. The electronics associated with the detector cannot determine the original neutron energy, which is "lost" due to the moderator.

A limiting factor in He³ neutron detectors, used in nuclear/radiological portals for the detection of fissile plutonium and more so for HEU detection, is the limited sensitivity of single He³ detectors.

Glass Fiber Neutron Detectors

Glass, or recently developed "glass fiber", detectors are used in some advanced neutron-detection portals, due to their robustness and semi-imaging capabilities.

The beam of fast neutron (FIG. 11) is slowed down by a moderator and creates Thermal Neutrons (TN). Thermal neutron flux impinges on the core of a glass fiber optic. In one example, this core is composed of glass with embedded $Li^6$, and $Ce^3$.

The thermal neutron is captured by the $Li^6$, through a nuclear process. Alpha and He3 particles are generated. The $He^3$ particles excite the $Ce^3$, which generates light photons. The photons travel along the fiber optic device and are detected by a photomultiplier (not shown) that amplifies the signal and creates a nanosecond electrical charge impulse that is fed to detection electronics.

TABLE 7

Comparison Between Prior Art He³ and Glass Fiber Neutron Detectors

| Technology | Advantages | Disadvantages |
| --- | --- | --- |
| He³ Detectors | Proven mature technology<br>Can be produced in any shape or size | Limited detection of high neutron flux<br>Low Sensitivity<br>Mechanical microphonics<br>Time-of-flight measurement (TOF) not enabled<br>Neutron spectroscopy not enabled |
| Glass Fiber Detectors | Solid state - robust<br>Maintenance free<br>Can be used for high neutron flux<br>Its spatial resolution provides an imaging option | Technology is not mature<br>Shape & size limitation<br>Sensitivity limitation<br>Can't measure neutron energy |

Prior Art Limitations

Whether it uses spectroscopic or non-spectroscopic detection and identification methods, the prior art has numerous limitations, some of which are:

1) Benign radiation is a major limiting factor of ASP (Advanced Spectroscopic Portal) threat detection performance. Background, defined as NORM medical and industrial sources, its direct radiation and scatter and x-radiation, is a major limiting factor to the achievement of premium SNM and RDD threat detection.
2) Conventional spectroscopy is detector sensitivity limited in real world cases, due to limited number of spectra superimposed on background radiation and other benign sources.
3) Limitation in energy resolution limits spectroscopic identification.
4) The prior art cannot deliver extremely low false alarm and low overlooked threat rates required for realistic development and operation of NRSP's. Achieving a true alarm rate of >99.6%, and a false alarm rate of <1:10000 vehicles is not possible using prior art techniques.
5) Manufacturing costs are a limiting factor for wide scale deployment of NSRP systems.
6) Multi-detector spectroscopy isotopes identification is complicated due to sensitivity to environmental conditions.
7) Prior art spectroscopic isotope identification algorithms may fail to identify isotopes in complex spectra.
8) Prior art technology is detection sensitivity limited.
9) The Prior Art does not detect other threats (e.g. explosives, bio-chemical agents).
10) Low throughput—The prior art is generally limited to slow moving objects, for example, vehicles moving at 5 MPH. It does not perform at vehicle cruising speeds of greater than 20 MPH.
11) The prior art requires two types of detectors one for gamma and one for Neutrons.

While the present invention does not ameliorate all of these limitations, some embodiments of the invention deal with one or more of them.

SUMMARY OF THE INVENTION

Generally, the Nuclear-Radiological Threat Screening Portals according to some embodiments of the present invention substantially depart from the conventional concepts and designs of the prior art. In some cases this provides apparatus and method having improved performance and/or substantially lower cost.

In an aspect of some embodiments of the invention, a radionuclide emission imaging detector is used to determine the presence, position and/or distribution of contraband nuclear material in a screened carrier, which may be a vehicle, a person, or cargo.

In an aspect of some embodiments of the invention, a detector or plurality of detectors is provided which view(s) a screened carrier and forms both an image of nuclear radiation emitted from the screened carrier and determines spectral information from of detected nuclear radiation. This determination of spectral information is often termed "spectroscopy" in the art and herein. As used herein the terms spectrally sensitive detector and "spectrometer" are used interchangable for a device that generates spectral information as aforesaid. It is distinguished from simple energy windowing that is often used in forming images.

In general, the spatial resolution of the image need not be high and resolutions between 40 and 200 cm are considered to be adequate. At such spatial resolutions the location and/or distribution of potential threat materials within the carrier can be generally determined and optionally identified as benign or threatening. In some embodiments of the invention, the resolution may be as low as 10 cm and may be better than 20, 50, 75, 100 cm.

Optionally, the apparatus includes several detectors. At least one of these is an imaging detector and at least one other detector is a spectral detector. In an embodiment of the inventon, the spectral detector is capable of identifying the isotope from detected spectral information and further deciding if it is benign or illicit isotope.

In an embodiment of the invention a single spectrometer is used and its geometrical field of view is adjusted so that it views the source of radiation. Optionally, the position of the radiation source is first determined by the imaging detector. The approximate location of the source is then used to orient or position the field of view of the spectral detector so that the spectral detector determines the energy spectrum of the detected source.

It should be understood that the use of imaging in combination with optionally localized spectral detection allows for a more complete analysis of various threats posed by the screened carrier, including one or more of:

1) Two step evaluation of threats:
   a) Imaging of the screened carrier, optionally including background subtraction, determination of a quasi-point source with less than 5 σ, more preferably less than 3σ probability.
   b) Provide high quality energy spectroscopy to ID if the isotope is benign or a threat.
2) Alternative two step evaluation of threats—similar to process 1, but with the imaging and background imaging energy windowed to get cleaner isotope identification by isotope imaging.
3) Addition of visual imaging—Capture a video or still image and superimpose it on or otherwise fuse it or use its information with a radionuclide image. The visual image helps to rule out nuisance alarms. For example, a radiopharmaceutical can only be on occupied passenger seats or a NORM cargo cannot be under the engine hood. Unusual placement of radioisotopes can be used to trigger an alarm process, while expected placement can reduce the probability of the radioisotope being a threat.
4) Imaging and spectroscopy with at least one same detector.
5) A combination of:
   a) High sensitivity, low energy resolution imaging;
   b) Low sensitivity, high energy resolution imaging;
   c) Imaging guided spectroscopy (isotope ID);
   d) CCTV Fused imaging to provide a four dimensional orthogonal or quasi-ortogonal "forensic" friend or foe selectivity.
6) Using the above methods to rule out a potential nuisance alarm. For example, if the radiation source has an area greater than 0.8 m² it is unlikely to be an RDD or SNM. In addition, since 90% of NORM have gamma radiation of 1.4 MeV of $K^{40}$, its presence can be used to confirm the presence of NORM. While this is not a perfect predictor of the benign nature of an imaged object, it, optionally together with the nature of the isotope(s) detected can be used to eliminate or identify benign sources.
7) Use of 2D imaging to ameliorate or eliminate the problem of vehicle background masking.
8) 3D imaging of the screened carrier.

Computing is optionally provided to determine the presence or absence of a threat based on the inputs from the detector or detectors.

An aspect of some embodiments of the invention is concerned with three dimensional tomographic imaging of a moving upright animate carrier or vehicle suspected of carrying threatening nuclear materials.

In an embodiment of the invention a plurality of elongate imaging detectors are placed on at least three and preferably five sides of a portal which is large enough for an upright person or a vehicle to pass through.

Optionally, the detectors are one dimensional imaging detectors.

An aspect of some embodiments of the invention is concerned with an elongate liquid detector having an entrance face substantially transparent to radiation to be detected and that is partitioned into sections by one or more partitions such that each section has part of its periphery formed by a portion of the entrance face.

In an embodiment of the invention, the partition reflects a substantial portion of light incident on it.

In an embodiment of the invention, the partition is substantially transparent to the radiation being detected. This allows for energy to be collected in a plurality of sections to improve energy determination. Thus, energy that is deposited in adjacent sections can be used in determining the energy of the radiation.

One area of technology in which nuclear events are detected is in nuclear imaging of humans. However, the field of nuclear threat screening differs from nuclear imaging of humans in a number of important ways. Firstly, in humans, the type of nucleus is known (it is inserted into the patient) and all the imaging device needs to do is to determine the distribution. This precision of mapping of this distribution is generally critical to proper diagnosis of the patient. Furthermore, unlike the present field, in medical nuclear imaging the amount of nuclear material is controllable and the radiation from the patient is generally much, much larger than in threat determination. Thus, except for radiation from the body of the patient itself there is generally no significant problem of background radiation. Furthermore, the sensitivity and spatial resolution requirements of Nuclear Medicine and threat detection are so different that existing NM equipment are not usable, as a practical matter for threat detection.

Thus, in general, the art has not considered techniques, methods and apparatus for nuclear medicine imaging as being a useful basis for threat detection. In the present application, some of the techniques, methods and apparatus described and claimed may bear some resemblance to their counterparts used in medical nuclear imaging. However, such equipment is not generally useful in threat screening and it is not obvious as to how, if at all such equipment could be modified for use in screening, which may require (or be content with) equipment and methods having a different size, material, orientation, fixed mature, configuration, etc.

There is thus provided in accordance with an exemplary embodiment of the invention, a method for detecting Special Nuclear Materials (SNM) or Radiological dispersion Devices (RDD), comprising: conveying an object along a predetermined path; imaging a distribution of radioactive sources associated with the object as it passes along the path; determining the presence and location of one or both of an RDD or SNM radioactive source within the object. In some exemplary embodiments of the invention, the method further comprises determining at least one spectral characteristic of the radioactive source; and classifying the source as benign or as a potentially illicit radioactive material, based on one or both of the determined presence and location and determined spectral characteristic. Optionally, determining the spectral characteristic comprises determining the characteristic responsive to the determination of location of the radioactive source. Optionally, determining the spectral characteristic comprises acquiring radiation using a spectrally sensitive detector that is separate from an imaging detector used to form the radionuclide distribution. Optionally, the imaging sensor is located at a first point along the path and wherein the spectrally sensitive detector is located further down the path.

In some exemplary embodiments of the invention, the method further comprises adjusting a field of view of the spectrally sensitive detector responsive to the determined location. Optionally, adjusting the field of view comprises adjusting a location of the spectrally sensitive sensor. Optionally, adjusting the field of view comprises adjusting an angle of one or more collimator septa of the spectrally sensitive detector. Optionally, imaging comprises neutron imaging. In some exemplary embodiments of the invention, the method further comprises: determining the presence of radionuclide quasi-point sources in the image; and classifying the source as likely to be benign or as likely to be illicit nuclear material based on whether the source is a quasi-point source. In some exemplary embodiments of the invention, the method further comprises: determining the presence of quasi-point sources in the image, wherein classifying the source as likely to be benign or as a likely to be illicit nuclear material comprises classifying based on whether the source is a quasi-point source. Optionally, at least a fraction of a population of particles used to determine the spectral characteristic is determined based on spatial distribution of radiation sources of the image. Optionally, an identification of radioactive threats and/or benign sources is based on data fusing of the imaging and the at least one spectral characteristic. In some exemplary embodiments of the invention, the method further comprises identifying at least one isotope of the source based on the at least one spectral characteristic.

Optionally, the object is a vehicle. Optionally, the object is an upright person. Optionally, the object is a package or parcel.

In some exemplary embodiments of the invention, the method further comprises acquiring an electronic visual image of the object. In some exemplary embodiments of the invention, the method further comprises utilizing the visual image of the object to classify the source as potentially benign or potentially illicit. Optionally, imaging comprises: acquiring a plurality of one dimensional images of a passing object; and fusing the images into a two dimensional image. Optionally, classifying comprises separately determining the presence of a plurality of threat isotopes, utilizing different criteria for the determinations.

There is thus provided in accordance with an exemplary embodiment of the invention a method for detection of nuclear radiation comprising: providing an image of a distribution of nuclear radiation from an object; and classifying the distribution as belonging to a benign source or a weapons source. Optionally, the object is a person. Optionally, the object is a conveyance.

There is thus provided in accordance with an exemplary embodiment of the invention an apparatus for detecting Special Nuclear Materials (SNM) or Radiological dispersion Devices (RDD) from an object comprising: at least one detector, operative and configured to detect radiation emanating from at least RDD and SNM associated with an object passing along a predetermined path and to form an image output based on the detected radiation; a controller configured to receive the image output and to determine the presence and location of a radioactive source or sources within the object. Optionally, the at least one same detector is also operative to generate spectral energy information on at least RDD and SNM radionuclide sources. Optionally, the controller is operative and configured to receive the spectral energy information and determine whether the radioactive source is a benign or threat source based on the image data and on the spectral energy information. Optionally, the at least one detector comprises: at least one imaging detector that produces a radionuclide image; and at least one spectral energy detector that determines spectral information from radiation at the determined location. Optionally, the controller is operative to receive the spectral information and determine whether the radioactive source is a benign or threat source based on the image data and on the spectral information. Optionally, the at least one imaging detector has a first field of view and wherein the at least one spectral detector has a second field of view and wherein the first and second fields of view are arranged such that an object can pass from the imaging detector to the spectral energy detector as it passes along the predetermined path. Optionally, the controller controls the second field of view such that the second field of view includes the detected source, wherein the second field of view is smaller than the first field of view. Optionally, the spectral detector is movable and wherein the controller translates the spectral detector to include the detected source in the second field of view. Optionally, the controller determines a height of the source and adjusts the height of the spectral detector responsive to the determined height. Optionally, the controller determines a position of the source along the path and wherein the spectral detector is translated in a direction parallel to the path to keep the source in the second field of view as the source travels along the path.

In an exemplary embodiment of the invention, the apparatus further comprises a velocity detector that determines a velocity of the object and wherein the controller utilizes the velocity to keep the source in the second field of view as the source travels. Optionally, the spectral detector comprises a collimator having septa that define the second field of view and wherein the controller controls an angle of the septa such that the second field of view includes the source as the object passes the spectral detector. Optionally, the at least one imaging detector comprises an organic scintillator. Optionally, the organic scintillator is a liquid scintillator. Optionally, at one detector of the at least one detector is sensitive to neutrons and wherein the image is an image of a neutron source.

There is thus provided in accordance with an exemplary embodiment of the invention a liquid scintillator detector comprising: a vessel filled with liquid scintillator material; a front face that is at least partially transparent to radiation detectable by the liquid scintillator material; at least one partition that separates the vessel into sections; and a plurality of light detectors arranged to detect light produced in the liquid scintillator, wherein each section is situated within the vessel such that one portion of its periphery is formed by a portion of its front face. Optionally, the partition reflects a substantial portion of the light that is incident on it into the portion. Optionally, the partition is substantially transparent to radiation detected by the liquid scintillator material.

In some exemplary embodiments of the invention, the liquid scintillator detector further comprises a controller that receives signals representing scintillations detected by each of the light detectors and determines the energy of an event responsive to signals generated by a plurality of the light detectors at a substantially same time. Optionally, the controller is configured to determine the incident particle energy by adding the signals from at least two adjacent sectors. Optionally, the scintillator detector is operative to detect and image gamma rays. Optionally, the scintillator detector is also operative to detect neutrons. Optionally, the scintillator detector is also operative to image neutrons. Optionally, the scintillator detector is also operative to detect neutrons. Optionally, the scintillator detector is also operative to image neutrons.

There is thus provided in accordance with an exemplary embodiment of the invention an imaging detector that is operative to detect and image a source or sources of neutrons. Optionally, the imaging detector is also operative to image and detect gamma rays.

There is thus provided in accordance with an exemplary embodiment of the invention a system for detecting nuclear/radiological treats, comprising: a nuclear radiation detector configured for detecting RDD and SNM and having an entrance surface, the detector being mounted so that its entrance surface is substantially perpendicular to a ground surface; and a collimator which defines a direction of view of the detector, the collimator being configured to reduce the effect of radiation emanating from the ground. Optionally, the collimator comprises absorbing septa and wherein at least some of the septa defining a vertical direction of view are inclined upward as compared to the ground surface. Optionally, the detector is an imaging detector.

There is thus provided in accordance with an exemplary embodiment of the invention a method for detecting threats, comprising: generating first image data based on radionuclide radiation detected by a detector in the absence of any threats; generating second image data based on nuclear radiation detected by the detector in the presence of a possible threat; and adjusting the at least one second image data based on the at least one first image. Optionally, the threats include one or more of RDD and SNM. Optionally, the first and second images are images of a neutron distribution. Optionally, the first and second images represent a spatial distribution of gamma particles. In an exemplary embodiment of the invention, the method further comprises determining the presence of a threat responsive to the adjusted second image.

There is thus provided in accordance with an exemplary embodiment of the invention an apparatus for radioactive emission tomographic imaging of a moving conveyance, comprising: a plurality of nuclear imaging detectors placed around the axis of a path suitable for passage of a moving conveyance, the detectors being operative to detect and image radiation from at least some RDD and SNM sources; and a controller that receives signals from the nuclear imaging detectors and forms a tomographic image of sources of radiation associated with the conveyance and its cargo. Optionally, the controller receives a plurality of sets of signals from the detectors as a vehicle passes along the path and derives a tomographic distribution of radionuclide sources associated with the conveyance.

There is thus provided in accordance with an exemplary embodiment of the invention a method for determining a nuclear threat associated with a conveyance, comprising: (a) detecting nuclear emissions from the conveyance at a first detection station; (b) determining conveyances that do not pose a threat according to a first criterion responsive to the emissions detected at the first detection station; (c) directing conveyances that contain potential threats according to the first criteria to a second detection station and releasing conveyances that do not meet the first criterion; (d) detecting nuclear emissions from the conveyance at the second detection station; (e) determining conveyances that do not pose a threat according to a second criterion responsive to the emissions detected at the second detection station; (f) directing vehicles that contain potential threats according to the second criterion to a third station for further inspection; and (g) releasing conveyances that do not contain potential threats according to any of the criteria, without further testing. In some exemplary embodiments of the invention, the method further comprises repeating at least (d) and (e) at least once for respective additional detection stations prior to (f).

BRIEF DESCRIPTION OF THE DRAWINGS

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements or parts which appear in more than one figure are generally labeled with a same or similar number in the figures in which they appear, in which.

DETAILED DESCRIPTION OF EXEMPLARY EMBODIMENTS

Exemplary Architecture

Figure 1:
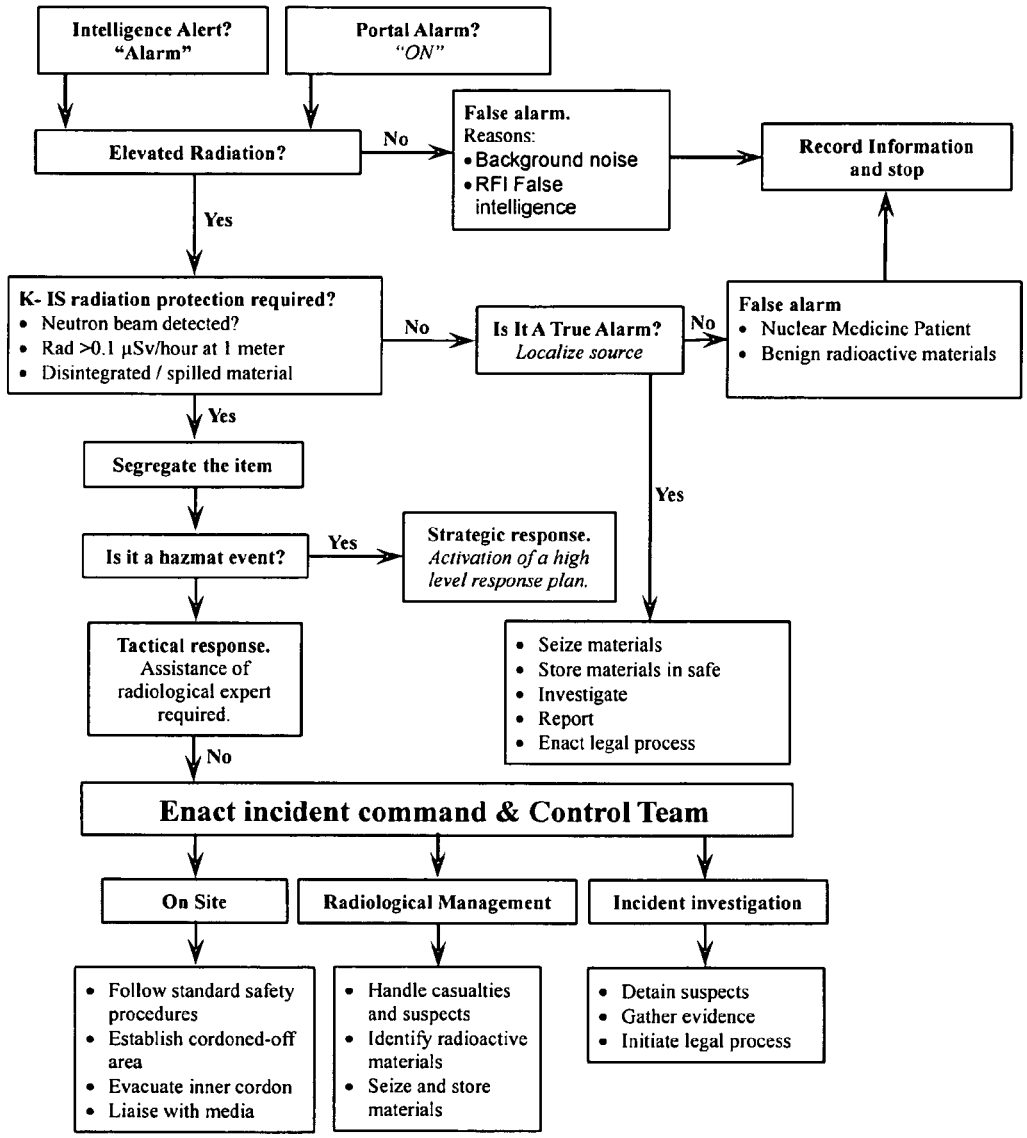
FIG. 1 shows Nuclear/Radiological Detection Portals—Security Forces Perspective, in accordance with the prior art.
Figure 2:
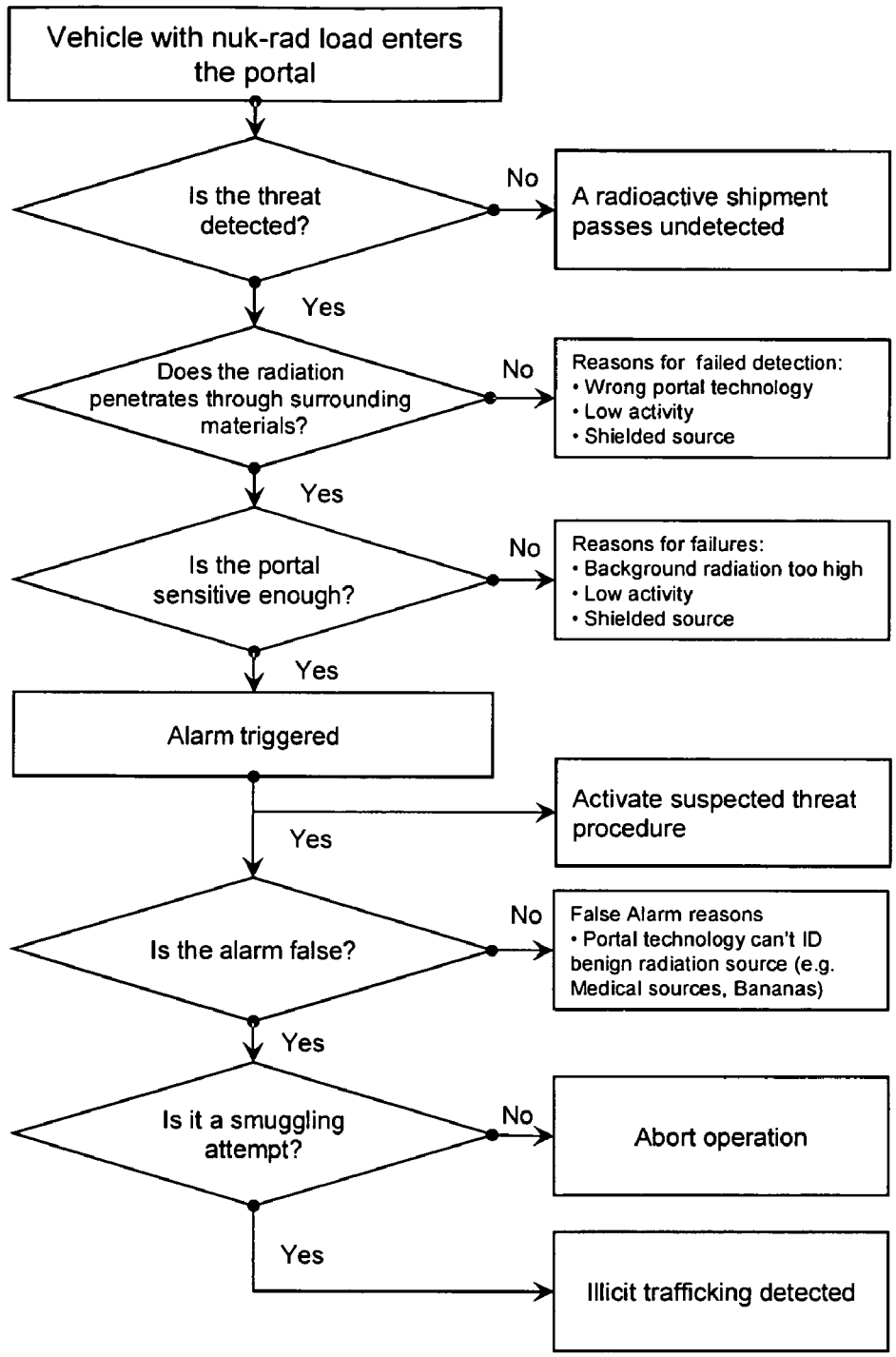
FIG. 2 shows Nuclear/Radiological Detection Portal Screening Flowchart—Checkpoint Operator's Perspective, in accordance with the prior art.
Figure 3:
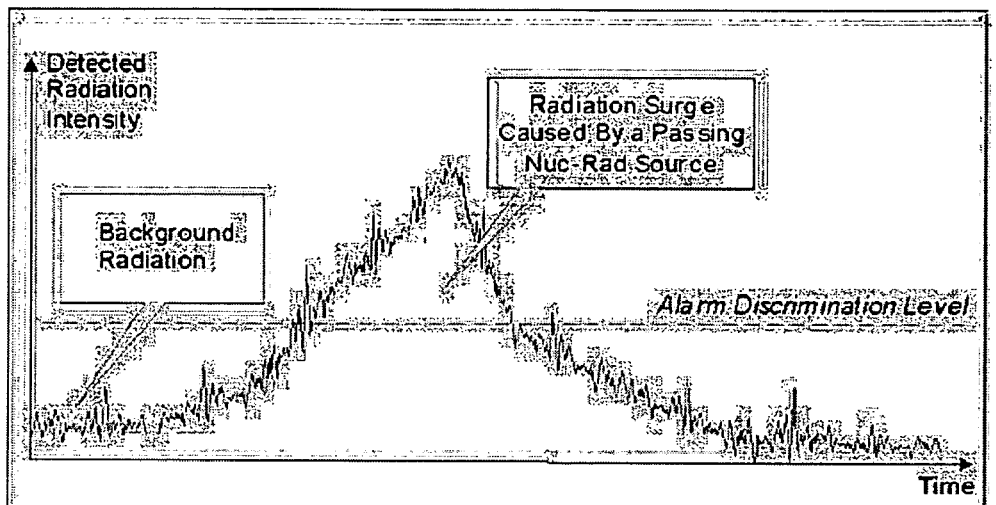
FIG. 3 shows Radiation detected from a Moving Radioactive "Point" Source (e.g. RDD), in accordance with the prior art.
Figure 4:
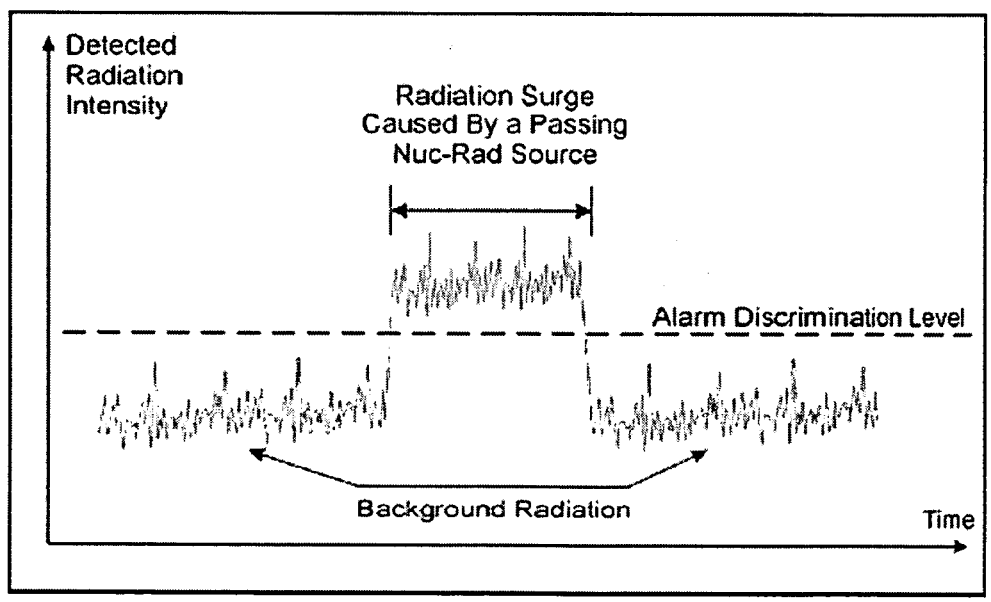
FIG. 4 shows detection of "Object" NORM Radiation, in accordance with the prior art.
Figure 5:
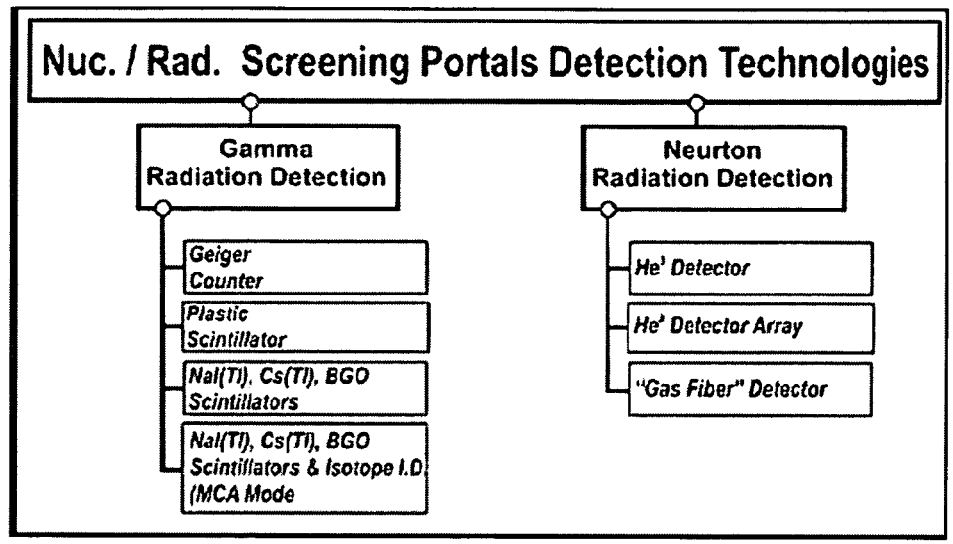
FIG. 5 is a table of prior art Nuclear/Radiological Detectors—Core Technologies.
Figure 6:
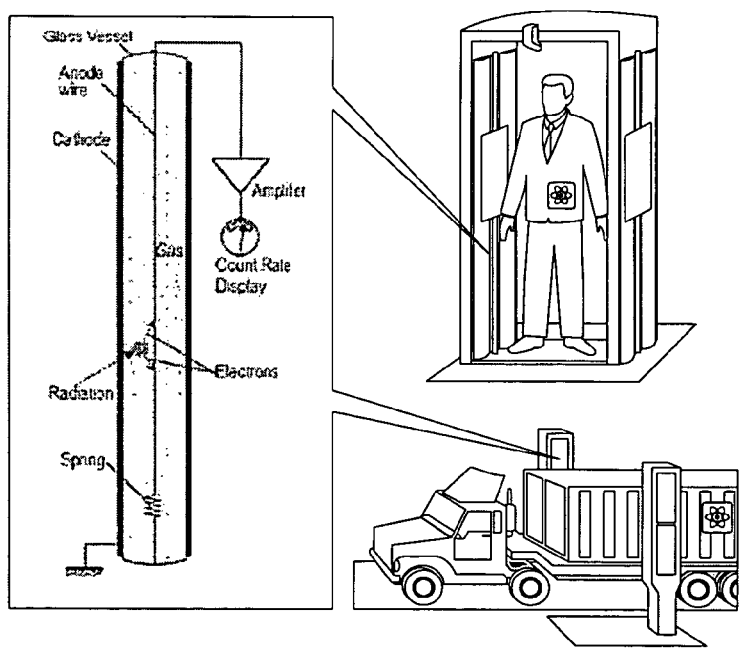
FIG. 6 shows the application of Geiger Counters in People and Vehicle Radiation Detection Portals, in accordance with the prior art.
Figure 7:
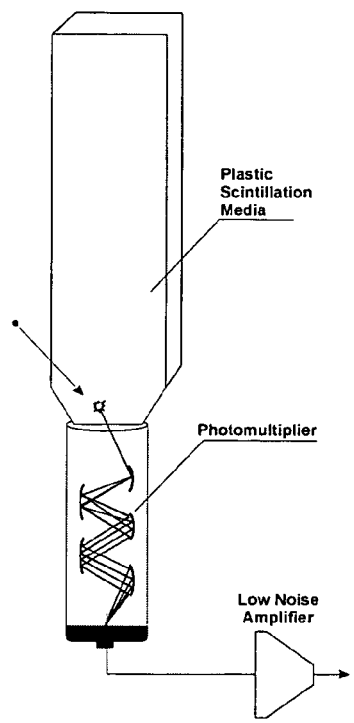
FIG. 7 shows Plastic Scintillators of the prior art.
Figure 8:
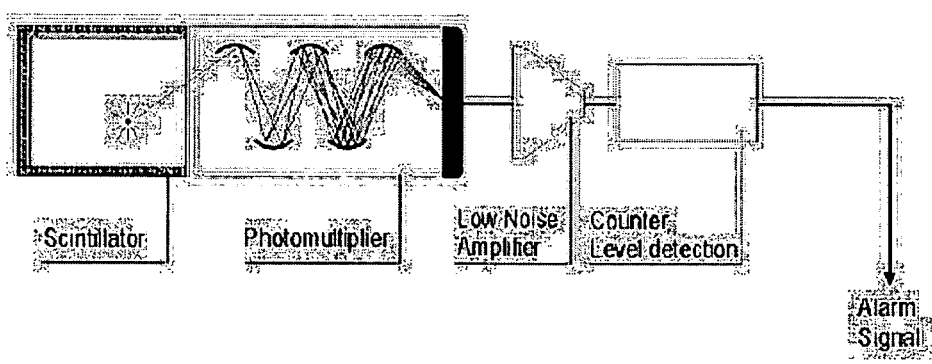
FIG. 8 outlines the principles of operation of NaI (Ti), CsI(TI), BGO Scintillators of the prior art.
Figure 9:
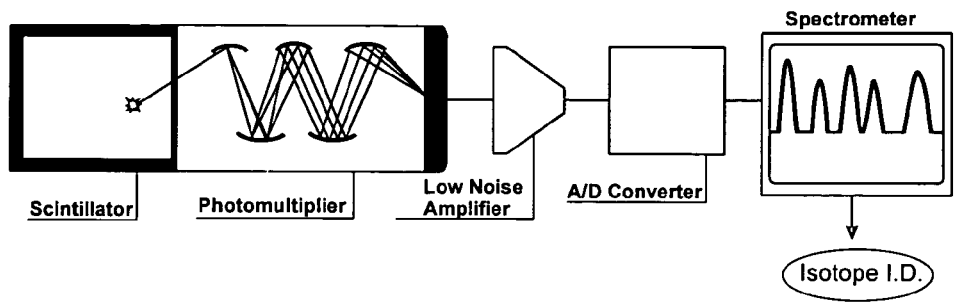
FIG. 9 outlines the principles of operation of NaI (T1), CsI (Ti), BGO Scintillators & Isotope I.D. (Multi Channel Analyzer) of the prior art.
Figure 10:
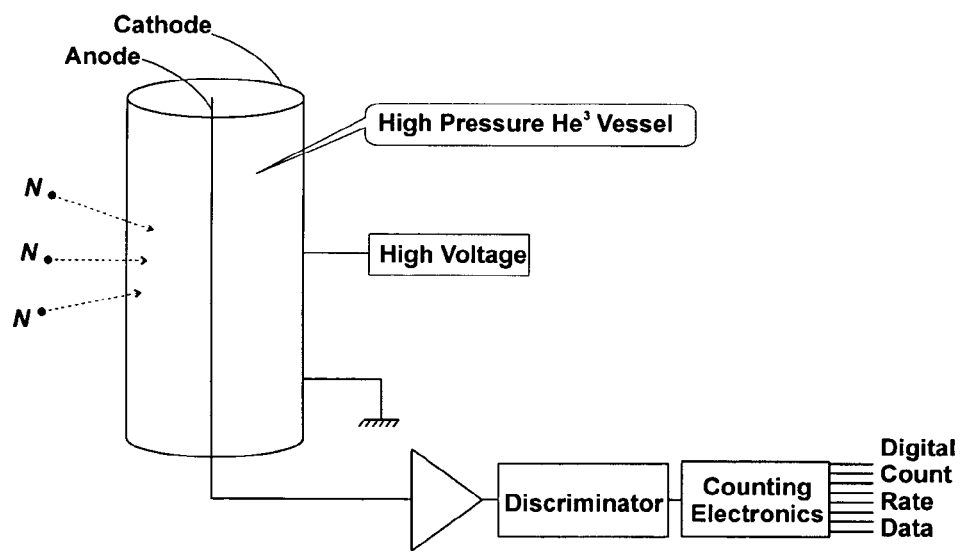
FIG. 10 illustrates a He3 Detector of the prior art.
Figure 11:
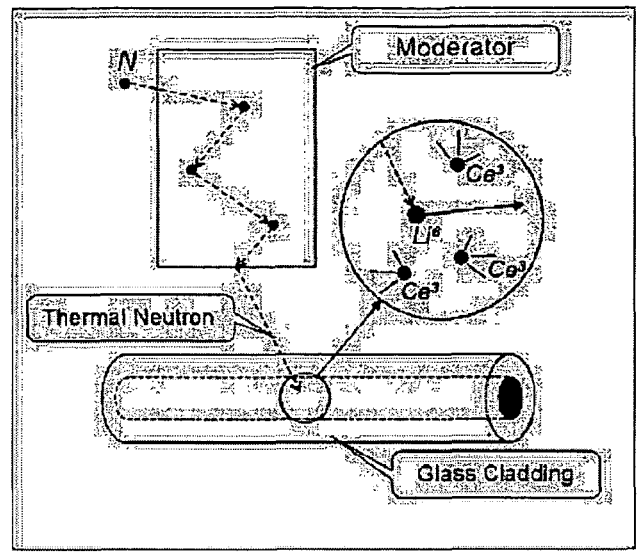
FIG. 11 illustrates the principles of operation of a Glass Fiber Neutron of the prior art.
Figure 12:
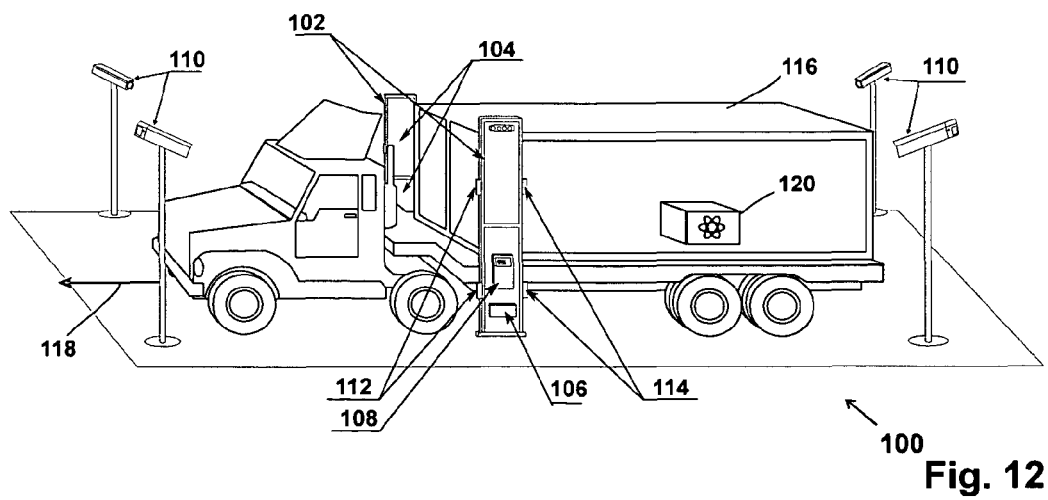
FIG. 12 is a schematic illustration of the basic system architecture of a portal, in accordance with an embodiment of the invention.

An exemplary architecture of a detection system portal 100 according to some aspects of the invention is shown in FIG. 12. This embodiment includes two support stands 102, one on each side of the portal's lane, at least one and preferably both having at least one radiation detection panel 104. Each such panel includes a detector bank and an "electronics package" (described below). Each support stand is shown as having two panels in this embodiment. This allows for using a smaller and more manageable panel to provide a sufficient height to scan large vehicles.

Optionally, the portal includes an uninterrupted power source 106. Control signals and the radiation sensor panels' data are cable-linked (or wireless linked) between a control box 108 and the "detection assemblies", and the optional ancillary units (e.g., object ID (e.g., vehicle, train, people, packages) sensors vehicle ID systems 110, break beam sensors 112 and vehicle speed sensors 114). Since all these elements are straightforward and known to a person skilled in the art, they are not described in detail.

As a vehicle 116 travels in a direction 118, between radiation sensor panels 104, the vehicle is optionally identified and its speed is measured. Furthermore, if an RDD and/or SNM 120 is present in vehicle 116, radiation detection panels 104 receive and detect radiation as the RDD/SNM passes them.

Figure 13:
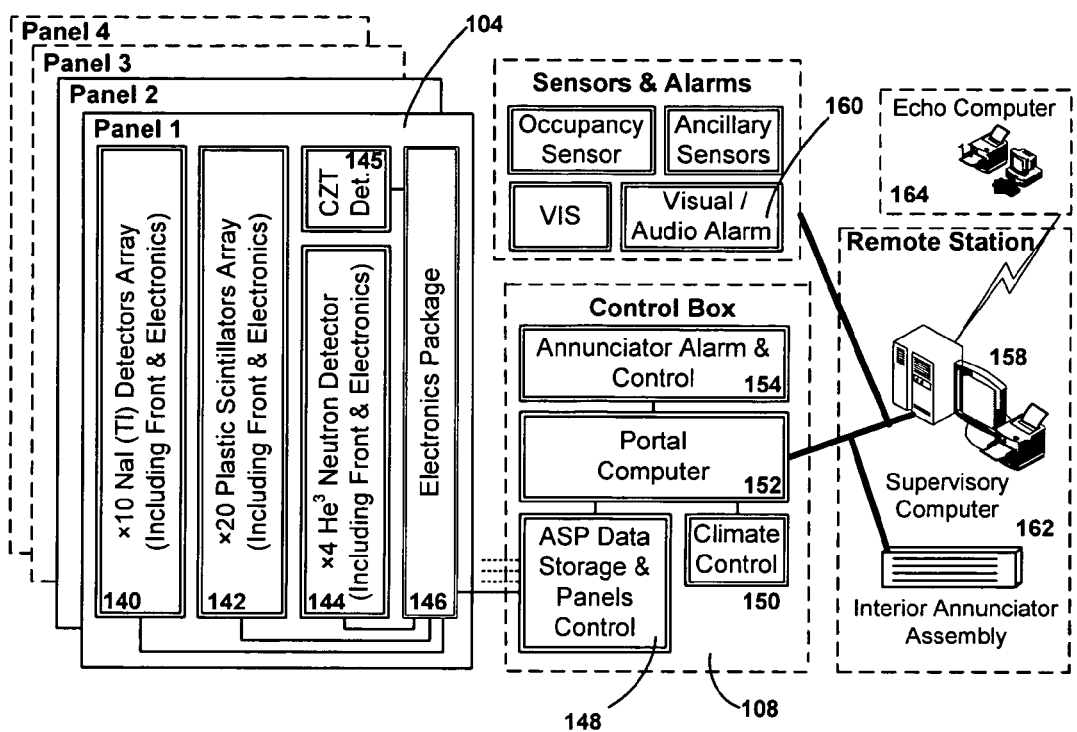
FIG. 13 is a schematic block diagram of radiation sensors panels and associated devices and electronics, in accordance with an embodiment of the invention.

As shown in FIG. 13, each radiation detection panel 104 includes, in the embodiment shown, at least one of the following: (a) a line array of NaI (T1) or other detectors detection assemblies 140; and (b) a line array of plastic scintillators (the plastic scintillators array) can be replaced by other detectors such as Xenon detector bars, a bar scanner, a liquid scintillator ID imager 142; optionally augmented by at least one Neutron detector (including front-end electronics) 144, and at least one (optional) high energy resolution detector (e.g., CZT, HPG) 145. An electronics package 146 is optionally provided in the panel.

Electronic package 146 optionally controls one or more of the radiation sensors data traffic to control box 108, detectors temperature stabilization 150, HV power supplies and other intra panel functions.

The control box optionally includes the nonvolatile raw data storage (not shown), including but not limited to storage of the detectors electronic data, and panels control unit 148; the portal computer 152, an alarm annunciator and alarm and control unit 154, which controls a visual Audio Alarm 160.

The system is controlled by supervisory computer 158 and receives inputs from control box 108, and the ancillary sensors (such as vehicle speed sensors 114, vehicle ID systems 110 and break beam sensors 112) and determines the presence of a threat. If a threat is indicated visual/audio alarm 160 and/or interior annunciator 162 are enabled. Optionally, an echo computer 164 is used to provide remote supervision of the operation of the portal.

It is to be understood that some of these functions are optional and that the packaging shown in FIGS. 12 and 13 is exemplary only and is not meant to limit the scope of the invention.

The Radiation Sensors Panel—Detailed Architecture

As shown, in an exemplary embodiment of the invention each radiation sensors panel (FIG. 14) includes a total of 35 detectors, namely one CZT detector 180 surrounded by a CZT shield 181, eight $H^3$ neuron detectors 182, ten NaI detectors 184 (such as 5' cylinders 3" high, with 90° collimators and gamma shields of lead lined with copper 183), twenty PS detectors 188 with focused collimators 190 and having secondary parallel collimators 192. Of course a lesser or greater number of detectors of each type can be used, and in some embodiments of the invention, some of the detector types can be omitted. For example, if liquid scintillators are used (as described below) they can replace both the plastic and neutron detectors, as liquid scintillators detects both gamma and neutron radiation. The arrangement shown is exemplary only and the numbers of detectors given are believed to give requisite sensitivity and (where applicable) spatial resolution.

The detector array is packaged in a preferably aluminum honeycomb structure, which provides structural strength as well as thermal uniformity across the detector's panel. This aluminum construction is temperature controlled to provide a first tier temperature stabilization of the detectors (especially the NaI spectroscopy channel) to meet temperature stability requirements (e.g., ±1%).

Within the aluminum structure, lead shielding and copper x-ray lining is provided to limit background radiation from all sides of the detectors, apart from their collimator field of view.

In another embodiment of this invention, a 1D (one dimensional) Plastic or other (e.g., partitioned liquid) Scintillator Imaging "Tower" provides 2D imaging of a moving object (2DPS) and is used to perform the NRSP function without a spectroscopic isotope ID or in conjunction with a spectroscopic isotope ID means. One dimension is provided by the array and the second by sequential sets of signals that are combined using the velocity corrected movement of an imaged object (e.g., vehicle, train, people, packages) to form a 2D image. Typical sizes of the panel are shown. As used herein, when the terms 2D or 3D imaging or imager are used, the meaning is that the final image formed is a 2D or 3D. When referring to the imaging elements themselves, the term 1D or 2D sensor or detector is used.

Alternatively a 2D imager with or without combining sequential acquisitions, can be used.

One embodiment of the 2DPS is a high-sensitivity, relatively high spatial resolution detector. In the case of a vehicle NRSP it may, for example, provide 80 cm FWHM at the center and 50 cm FWHM at the side of the lane, and energy resolution <28% FWHM at $Cs^{137}$ 2D radionuclide imager.

The 2DPS provides the following:
1) Radionuclide, 2D images (similar to nuclear medicine's bar scanner imaging). Such images provide the base for effective RDD/SNM detection performance, attained by collimator image formation, background radiation elimination and the high sensitivity of plastic scintillators.
2) Enhancing the performance of the high energy resolution (e.g., NaI) 2D imager and spectrometer (2DNS) by providing it with center of threat location data (e.g., RDD, SNM). This enables the radionuclide energy determination based on radiation from near the center of threat only, reducing background contamination. It is noted that the NaI imager has a generally poorer spatial resolution.

Figure 15:
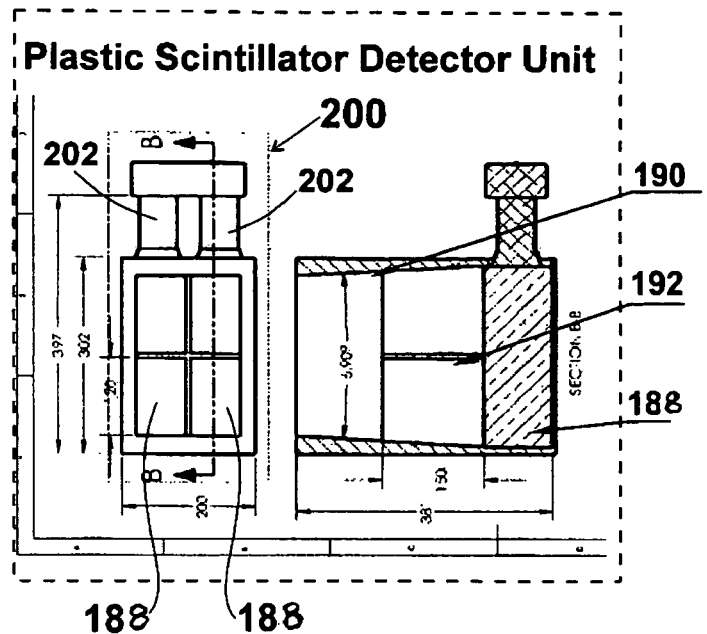
FIG. 15 is a schematic layout of a Plastic Scintillator (PS) Detector Unit of an embodiment of the invention.

Each support structure may include two identical organic (e.g., plastic, liquid) scintillator arrays. Each array of more than two plastic detectors includes, in an exemplary embodiment of this invention more than one PS detector unit 200 (see FIG. 15), each containing two detectors.

PS detector unit 200 is comprised of rectangular bar of plastic scintillator 188, each coupled to a photo multiplier 202, a shield and collimators 190, 192.

Various types of collimators may be considered, such as a focused collimator with a focal point at mid lane, or higher sensitivity (lower spatial resolution) parallel collimators, depending on the requirements of the system.

Figure 16:
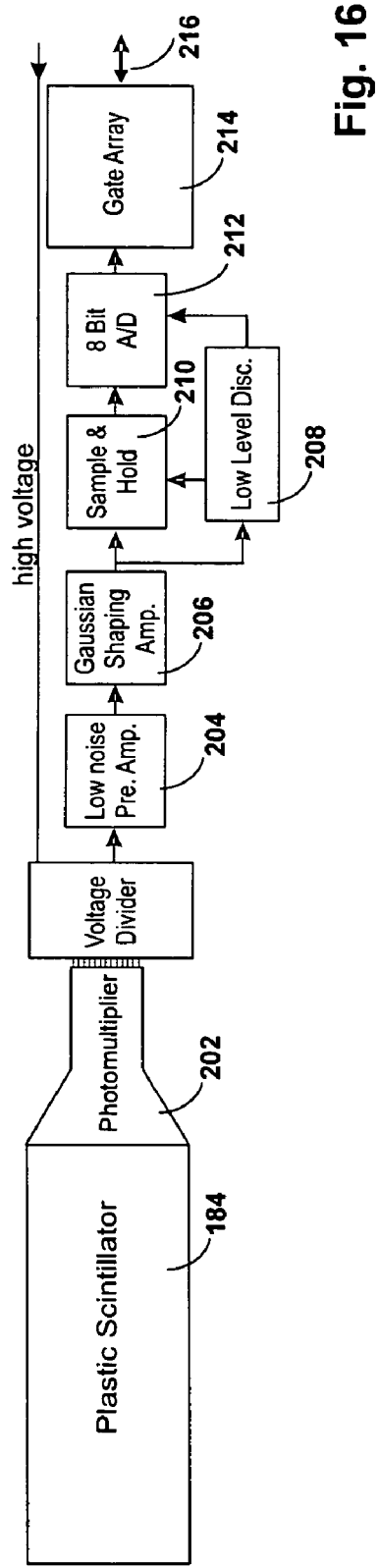
FIG. 16 is a schematic block diagram of plastic scintillator electronics of an embodiment of the invention.

FIG. 16 shows electronic circuitry associated with each plastic scintillator, in accordance with an exemplary embodiment of the invention. The signals of each PM 202 anode is amplified by a low noise pre-amplifier 204 and a Gaussian shape amplifier 206 (or other high signal to noise pulse shaping). A low-level discriminator 208 is set at approximately a 15 KeV level to control a sample and hold CKT 210, which feeds an 8 bit A/D converter 212. The energy resolution of the unit is 28% for $Cs^{137}$. Since the main problem of this type of scintillators is the escape quanta, a circuit (not shown) using coincidence electronics to superimpose concurrent signals of adjacent scintillators (within a time window of 5-50 nanoseconds) can be used. When superposition is used, the inter detector shielding is removed.

Figure 17:
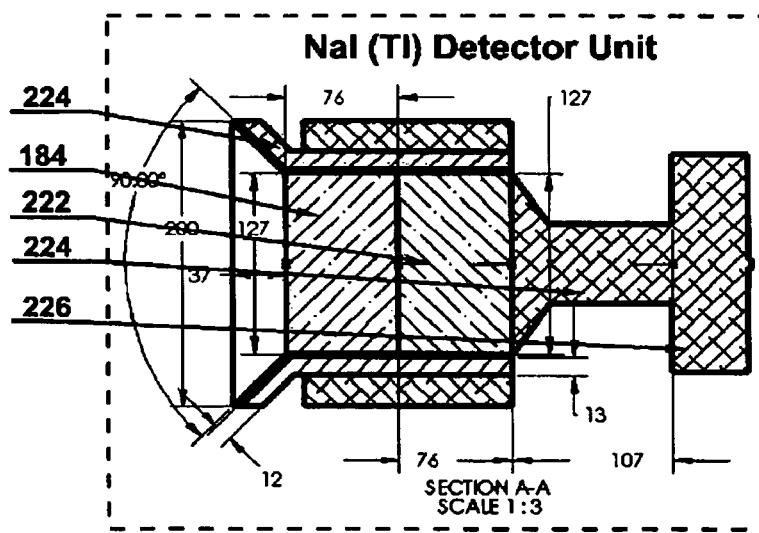
FIG. 17 is a schematic layout of a NaI (T1) detector Unit of an embodiment of the invention.

A gate array 214 (or another digital circuit) is provided to communicate the data via a daisy chain cabling (to limit cabling complexity) or other communication means 216, to the electronics package As seen in FIG. 17, the NaI(T1)detector pairs are optionally stacked in an Aluminum array to provide a thermally coupled detectors array (per detector panel).

In a typical application of the NRSP, when imaging is of a truck carrying a 40 feet container (total length=15 meters), at a nominal speed of 8 km/h, the scan time is 2-3 seconds. As the truck's speed cannot be guaranteed to be constant, by measuring the vehicle velocity correction can be achieved. The radiation data and velocity data can now be used to generate a unified emission image of the truck.

Figure 14:
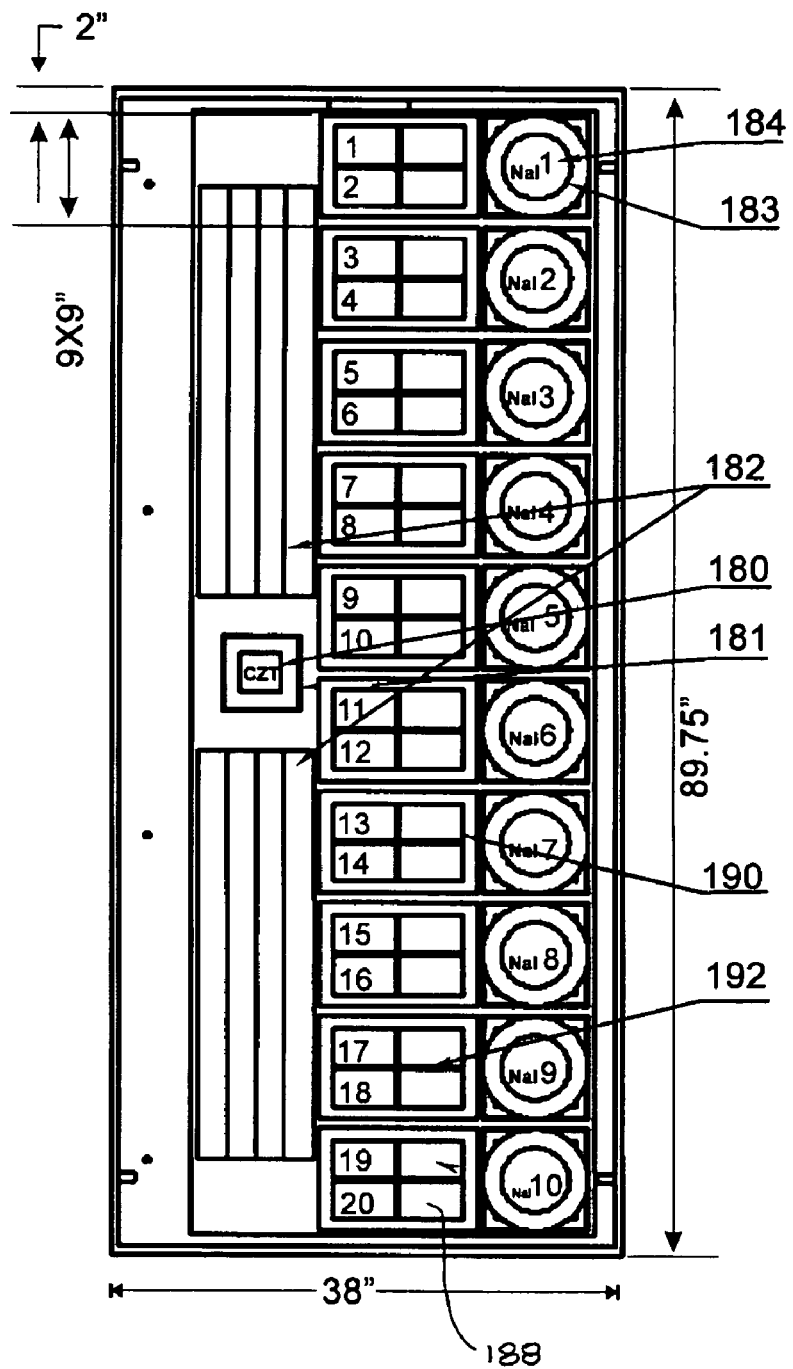
FIG. 14 is a schematic layout of a radiation sensors panel, in accordance with an embodiment of the invention.

As seen in FIG. 14, each radiation sensors panel 104 has a column of more than one scintillator (e.g., NaI(T1), BGO or CsI(T1)) detector blocks array 184 to provide high sensitivity high energy resolution and 2D imaging detector, and/or spectroscopy.

A schematic example of a NaI(T1) integrated detector 220 is shown in FIG. 17. In a preferred embodiment, a 5" diameter and 3" high scintillator block 184 (including a light guide 222 and a 5" photomultiplier) is shielded on all sides. A 90° (conical Apical Angle) Collimator and shield 224 provides exposure to background radiation only at 16% of the frontal field, thus eliminating 84% of the frontal field background radiation. The detector shield and collimator may be constituted of low Z metals lined "old" lead.

Figure 18:
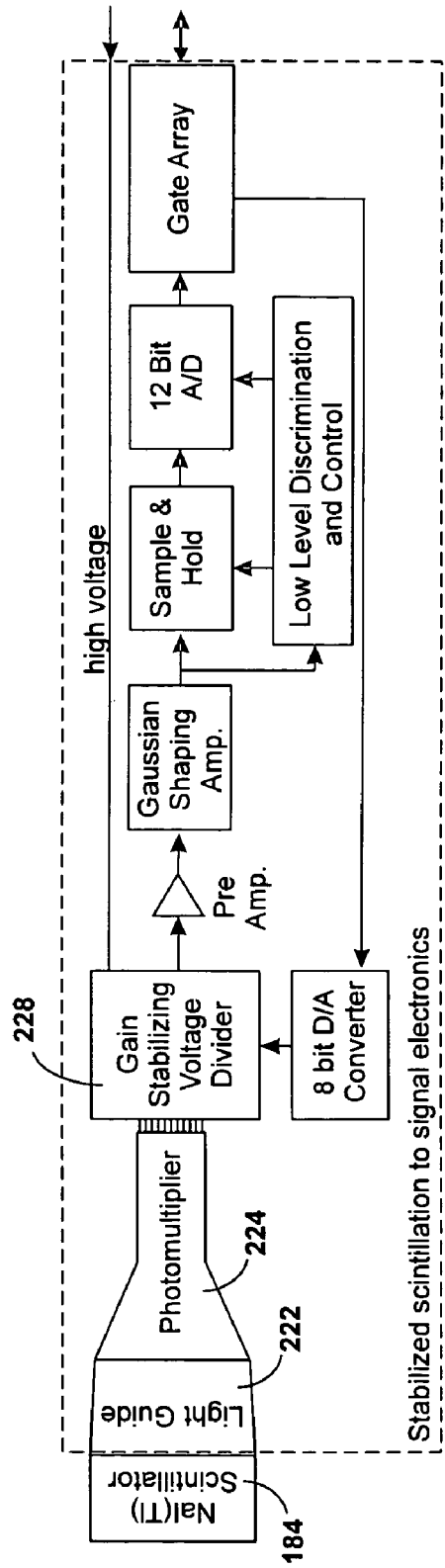
FIG. 18 is a schematic block diagram of NaI (T1) Detector Unit electronics of an embodiment of the invention.

As seen in FIGS. 17 and 18, each PM is linked to a high-resolution stable electronic circuit 226. This circuit delivers high resolution (typically 7.5% FWHM energy resolution at $Cs^{137}$.) The D/A typically delivers 12 bit data.

Optionally, voltage divider 228 includes an automatic gain stabilizer which optionally augments the detector block's temperature stabilization system, resulting in a high (typically 50 ppm/° C. detector temperature stabilization). Such stabilization is desirable for the superposition of spectra emanating from a plurality of NaI detectors.

It is noted that while the energy resolution of the NaI array is satisfactory in some cases, the NaI image spatial resolution is much lower than that of 2D organic scintillator systems. As stated above, this NaI (or other high resolution detector array) can function either in conjunction with the 2DPS channel, or as a stand alone imaging and spectroscopy apparatus.

Neutron Detection

In a preferred embodiment of this invention, a field proven $He^3$ technology is used. The NRSP will have a bank of 4×4=16 He3 cylindrical 80 cm long He3 detectors housed in an appropriate moderator. Optionally a plurality of neutron detectors is used to increase sensitivity. Fewer or more than 16 can be used.

The SNM/RDD detection methodology for gamma radiation, according to some embodiments of the invention, described herein utilizes both 2DPS image generation and a high energy resolution detectors array. Other configurations can be implemented.

It should be noted again that each of the above constructions as to size, numbers of detectors and details of construction are provided purely for illustrative purposes and are not meant to limit the invention.

As described above, each detected incident gamma event is stored in a mass memory "list mode." Optionally, the list mode includes the following data:
1) Time Stamp (a signal which provides the time of interaction),
2) Energy (a signal which represents the energy deposited in the detector),
3) 2D location (the number of the detector that detected the incident radiation The description below outlines the way this data is selectively used to optimize the NRSP detection performance.

Isotope Identification Methodology

In a preferred embodiment of this invention, a design is used based on a "one isotope at a time" analysis. Such analysis is aimed at maximizing the probability of true detection by tailoring computational and physical parameters for each and every isotope, utilizing both spectroscopy and at least one imaging method. For every scanned object, each of the isotopes is analyzed individually according to a flow chart similar to the $Co^{60}$ example described below with respect to FIG. 19. Since each such computational process takes less than 10 milliseconds, a typical overall, 32-isotope location and identification process will take less than 1 second. This allows for near real time location and identification. It should be noted that this method can be altered to detect more than one isotope at a time.

Example of a Single Isotope Detection and Identification: $Co^{60}$ Detection (FIG. 19)

In each panel of the exemplary embodiment shown above, there are two 2D $Co^{60}$ imaging channels that provide the probability for the existence of a $Co^{60}$ quasi point source and/or isotopes that have an energy peak that is higher than 1 MeV. There is a Gamma spectroscopy channel and a neutron channel (not needed for $Co^{60}$). The processing will be carried out on the data count from each panel separately.

Figure 19:
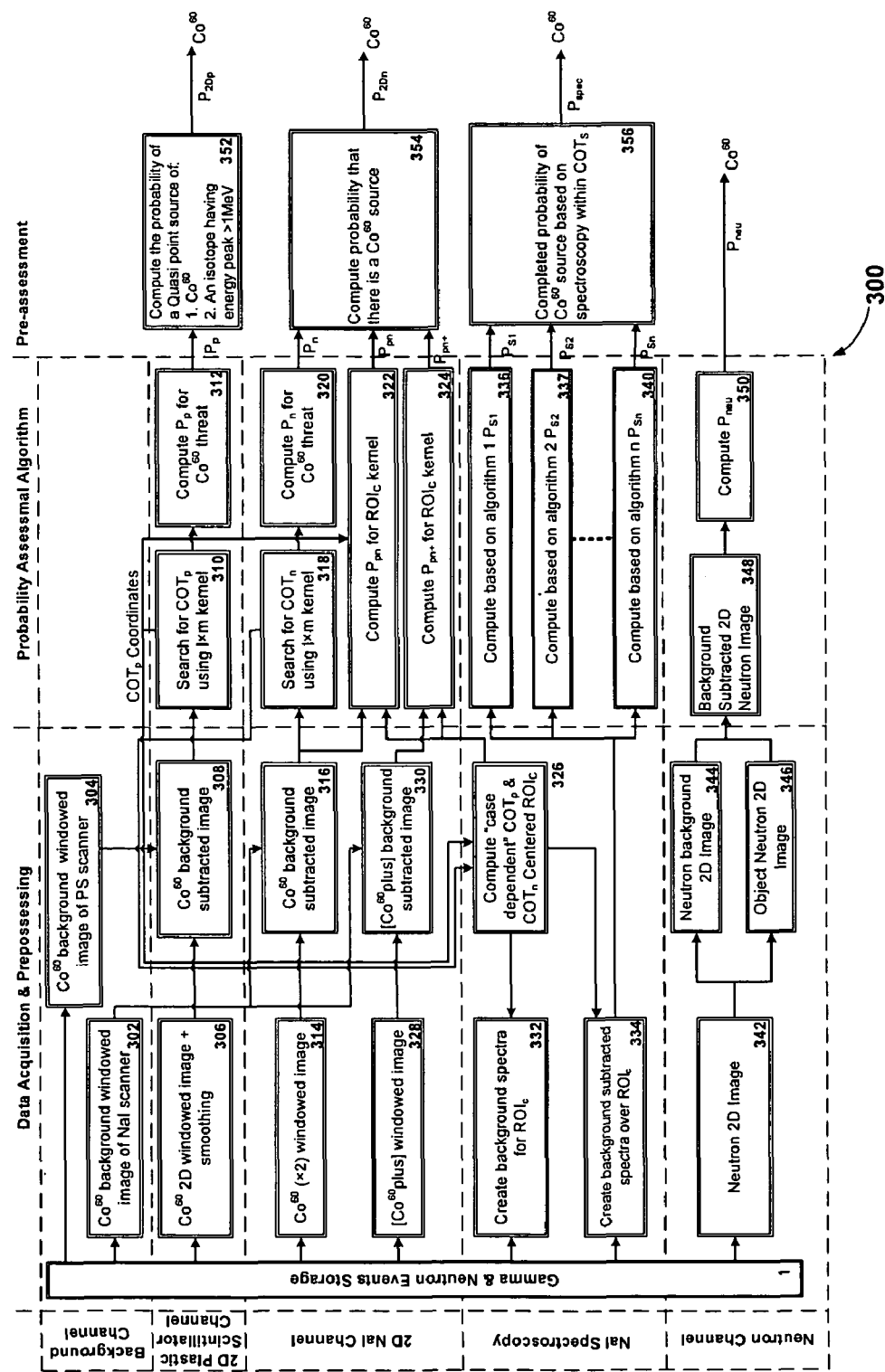
FIG. 19 is a schematic flowchart of Isotope Detection/Identification of Co60, in accordance with an embodiment of the invention.

As shown in FIG. 19, an exemplary process 300, has five channels. In FIG. 19, the terms $COT_p$ means Center of threat detected by plastic scintillator image; $COT_n$ means center of threat detected by NaI(T1) Scintillator image; ROI means region of interest and Pxxx means probability of $Co^{60}$ quasi-point source using channel xxx.

1) An Advanced Background 2D Map Determination Channel.

Two background maps 302, 304 are created by each of the detector arrays during the periods when there is no object (e.g., vehicle, train, people) available for screening. To optimally suppress background radiation effects, two images including only gammas that belong to $Co^{60}$ energy windows are created. One of these (302) is based on radiation detected by the NaI detector array (which also includes an additional energy range for a windowing application described later), and another by the plastic scintillator detector array Since $Co^{60}$ has two peaks at 1.17 and 1.33 MeV, a NaI image is created by gammas at the energy level of 1.15 MeV±40 KeV, and 1.33 MeV±50 KeV. This method eliminates all other (out of window) gammas, possibly suppressing the background by factor of 8-25. An additional window is created at 1.4 MeV±50 KeV for an image check application described in 3).

The $Co^{60}$ plastic detectors background map is similarly windowed by a single 1-1.45 MeV window (the larger range is due to plastic's poor energy resolution (FWHM<30%)). This suppresses background radiation by a factor of 8-15.

For other isotopes appropriate parameters (optionally different from those described above) would be used and expected.

Other means to further improve the background reduction in the presence of vehicles will be described separately.

2) The 2DPS Channel

A $Co^{60}$ specific 2D image of the object's radionuclide emission is acquired and smoothed (306), using the stored "list mode" data in the given energy-range window. A 9-point smoothing algorithm is optionally used to reduce stochastic fluctuations. This primary $Co^{60}$ image is then subtracted pixel by pixel from the P.S. background image (308), resulting in a background-suppressed $Co^{60}$ image. Next, a $1_x$m cm kernel (size of kernel may depend on the estimate of threat's depth inside the field, i.e., the orthogonal direction to the 2D image) is used to "scan" the image so as to determine the location of the radiating source called the Center Of Threat (COT) (310). Other search methods may be used alternatively or additionally. The average count density at a region of interest around the COT is then used to assess (312) the probability (Pp) for the existence of a localized radiation "point" source by comparing it to the number obtained from the pixels in its vicinity. This allows calculation of $\Delta\sigma$. ($\Delta\sigma$ is the difference between the average count density at COT and the count density in other image regions divided by the standard deviation ($\sigma$) of the other regions).

Furthermore, if the respective radiation detection panel on the opposite side of the road will provide a ±30% similar count density (indicating that the source is close to the center of the lane), the two opposite datasets are superimposed providing an enhanced $\Delta\sigma$. This results in a better detection reliability, particularly if $\Delta\sigma>6$.

3) A 2D Imaging and Spectroscopy Channel (Designated 2D NaI Channel in FIG. 19).

The NaI 2D imaging channel provides in many cases a poorer spatial resolution (compared with the P.S. image), and an energy resolution of 6.5% for $Co^{60}$. First a windowed image is acquired (314). A 20×60 pixels image is created by events that pass two energy windows (1.15±0.04 and 1.33±0.05 MeV). Background subtraction helps to reduce background radiation of other isotopes' photo-peaks and scatter by a factor of 15-100 (316).

In a preferred embodiment of the invention, one, two or three methods may be used to ascertain the probabilities: $P_n$ and $P_{pn}$ that a $Co^{60}$ quasi point source is present (320), and $P_{pn+}$ that the "detected" isotope is not a scatter effect generated from another isotope emitting at a higher than $Co^{60}$ energy E>1.4 MeV (322, 324).

The first method (318) determines $P_n$ in a manner similar to that used to determine to $P_p$ from the plastic scintillator detections. Note, that a different sized kernel that takes into account the spatial resolution of the NaI detectors is optionally used to determine $COT_n$.

After $COT_n$ is determined $P_n$ is computed (320) and $\Delta\sigma$ is assessed accordingly.

The second (322) and third (324) threat computation methods rely on calculating $P_{pn}$ and $P_{pn+}$ which are centered on a COT that incorporates both $COT_n$ and $COT_p$ (326). The choice of $ROI_c$ utilizes probable source depth inside the container (obtained from comparing PS counts from both opposing panels), energy range of isotope, vehicle type, etc. Ppn+ (324) is the probability that the image is an image of a higher than $Co^{60}$ energy Compton scatter and with a kernel size $ROI_c$. For the second method (322), $P_{pn}$ is calculated in a same manner as in the first method with $COT_{pn}$ as the presumed center of threat, and $ROI_c$ as the pixel size. $Co^{60}$ plus relates to an isotope above $Co^{60}$ (>1.4 MeV) which may downscatter into $Co^{60}$ windows. This radiation can be used to correct the image at the $Co^{60}$ window for downscatter, for example, by subtraction based on statistical considerations.

Finally, the third method (324) repeats the same calculation as the second method, for an energy window that is higher than 1.4 MeV. Ppn+corresponds to the probability that the source detected at 1.33 MeV may be scattered from a higher energy emitting isotope (termed in FIG. 19 "NaI Spectroscopy").

4) The Spectroscopy Channel.

Isotope identification is typically difficult inter alia because of detector limited energy resolution, a limited number of detected gammas events, contamination by scatter of NORM and high energy peaks, and/or gammas emanating from the full field of view. To improve isotope identification one or more of the following features are provided in the design and/or additional processing is optionally performed:

a) To maximize the NaI (T1) detectors energy resolution scintiblocs (for example, cylindrical 5" diameter scintillators attached to a light guide, and 5" P.M.s) are used. This approach provides a 10-17% better energy resolution, (6.7% (at $Cs^{137}$) Vs 8%) than a rectangular slab of NaI with P.M. attached. This improved energy resolution is mainly the result of more uniform light collection of cylindrical "scintiblocs".

b) To enhance the number of collected gammas (sensitivity), 10 detectors with a total volume of 10 liters (for each panel, where a system contains 4 panels) are optionally used, linked to a high-sensitivity 90 degrees apical angle collimator, c) Since SNM and RDD are significantly smaller than the vehicle that is likely to transport them, the design uses the fact that the 2D plastic imager (and in some cases the NaI) determines roughly the coordinates of the threat (COTp). Using COTp and quasi-imaging information obtained from the NaI counters, a composite pixel size ROIc centered on COT is calculated, which is then used to eliminate potential spectra contaminating particles taken outside its field of view. Using this method it is possible to eliminate approximately 90% of the potential spectral.

d) After pre-processing of the spectra, complementary methods are implemented (336, 337) to calculate a degree of fitness to an expected reference spectra for $Co^{60}$.

In another preferred embodiment of this invention, the use of more than one spectroscopy based isotope identification methods are used. As no one method is perfect, using different methods can allow for a "jury" vote as to the ID.

Optionally, neutron imaging 342 is performed. A one or two dimensional spatial neutron distribution is acquired from a stacked array of neutron detectors. A neutron background 1D or 2D image is acquired (344) and an "object" neutron image is acquired (346) during the "object" scanning. The background 1D or 2D image is subtracted from the "object" scanning image (348) and a probability Pn is determined (350) using 2D image processing to determination of the presence of a neutron emitting source Alternatively or additionally, neutron detection can be performed without imaging, by subtracting background radiation from object radiation and assessing a threat based on the difference.

Blocks 352, 354 and 356 represent the computation of the probability of the existence of a $Co^{60}$ isotope, utilizing one or more of the methods described above. These probabilities, together with the probability based on the Neutron measurement are used to determine whether an alarm is declared. Methods of computing the probability of existence of a radio-isotope from count data are known in the art.

Figure 20:
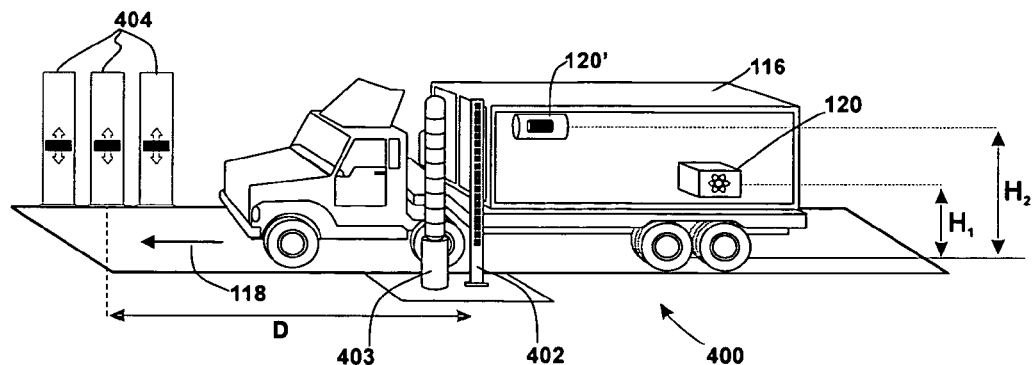
FIG. 20 is a schematic illustration of the basic system architecture of a portal, incorporating the "lift" concept, in accordance with an embodiment of the invention.

FIG. 20 schematically shows another screening portal 400, in accordance with an embodiment of the invention. In this embodiment a 2D a first high spatial resolution imager 402 is mounted separately from one or more second high energy resolution detector arrangements 404. A second neutron imager 403 (stacked neutron detectors) is optionally also provided. As shown, the distance between imager 402 and high energy resolution detectors 404 is designated as D (approximately 5-10 meters). Detector(s) 404 provide(s) spectroscopic and/or other high energy resolution tasks. In accordance with an exemplary embodiment of the invention, the energy detector is mounted on a lift mechanism. When a possible threat is detected by imager(s) 402 and/or 403 it determines the height of the threat(s) (H1 and H2).

Figure 21A:
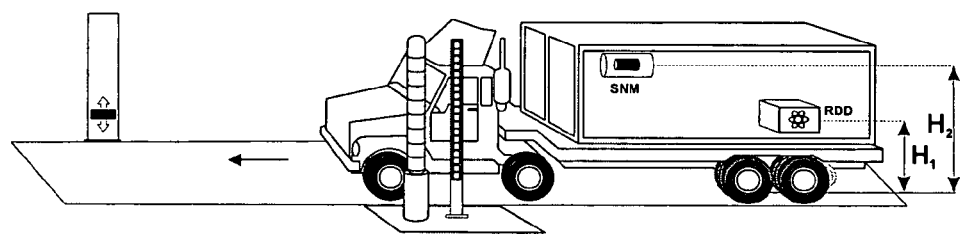
FIGS. 21 A-C illustrate the screening sequence, utilizing the lift concept, in accordance with an embodiment of the invention.
Figure 21B:
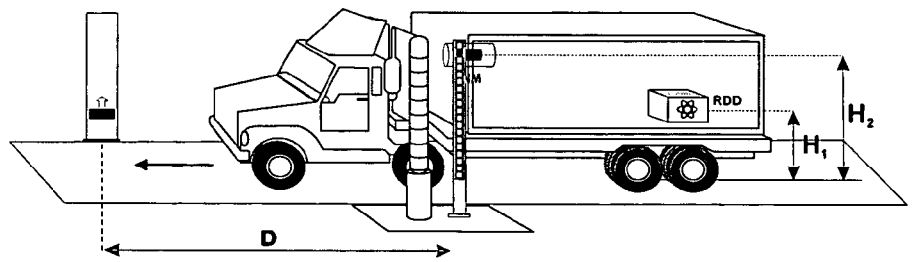
Figure 21C:
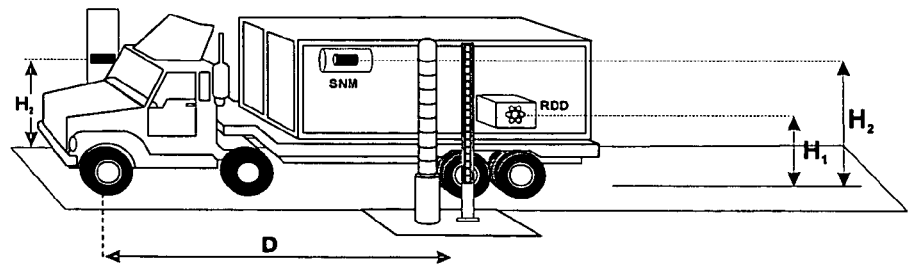

FIGS. 21A-C illustrate the operation of the embodiment of FIG. 20, when one or more threats (102 and 120') are present.

When an object (e.g., truck) is at the first detector (panel 102), the threat height is delineated, its center of gravity is computed, and a control signal is fed to the drive mechanism of the energy detector's lift to place the high energy detectors at the height (H) of the specific threat. The advantage of this embodiment is that the high energy resolution detector is placed in the best loci to examine a potential threat. This allows for suppression of background from higher and lower elevations. Optionally, the size of the high energy resolution detector is matched to one or both of the formed image spatial resolution and the expected maximum size for the "quasi-point" source threat.

Where more than one high energy resolution detector is available (three are shown in FIG. 20), each can be set at a different height to examine a different one of the threats spectroscopically. Alternatively or additionally, different spectrometers are used depending on an initial assessment of the type of threat of each suspected source 120.

This embodiment offers both cost saving and improved high energy resolution, since all these detectors are located in a locus that provides source to detector acquisition optimization. Note that FIGS. 21B and 21C show the above mentioned detectors oriented to the threat height.

Figure 22:
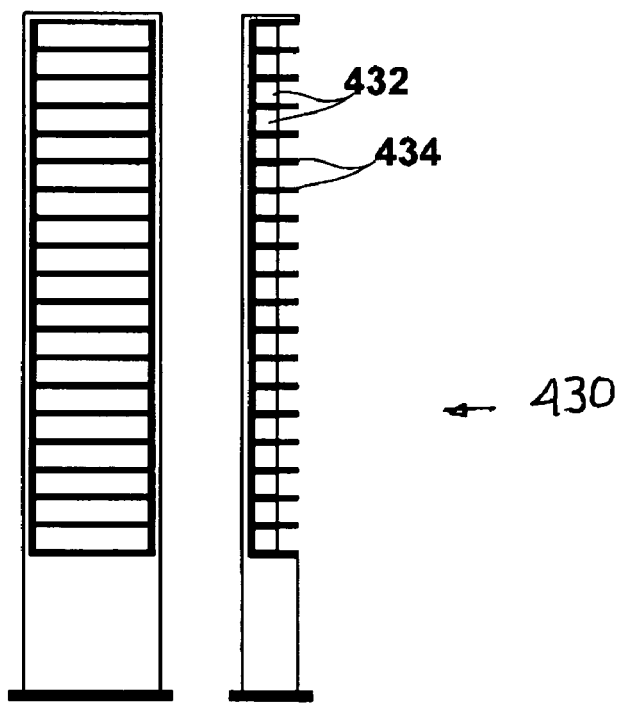
FIG. 22 is a schematic illustration of an exemplary primary plastic scintillator scanner, in accordance with an embodiment of the invention.

In FIG. 22, a typical first imaging detector 430 comprising an array of plastic scintillators 432 and collimator 434 is shown.

Figure 23:
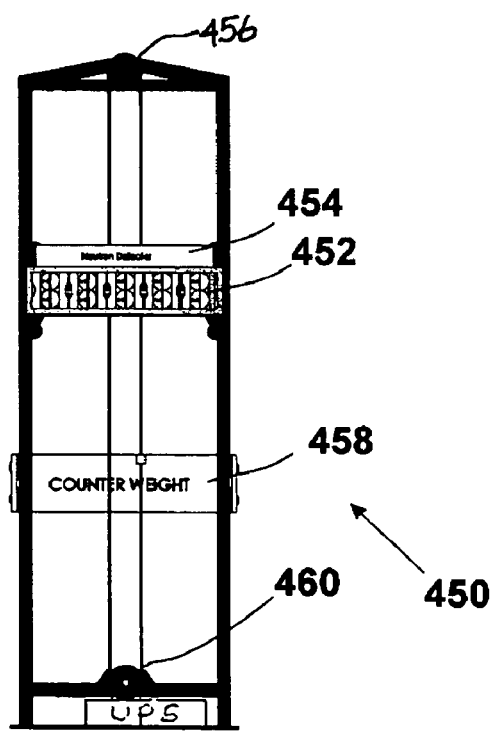
FIGS. 23-26 are schematic illustrations of the structure of a detector, in accordance with an embodiment of the invention.

In order to reduce the distance D, a counter-weighted lift mechanism 450 (FIGS. 23-25) is optionally used which optionally enables a rapid (1-2 seconds) lift response time. The desired positioning response time is related to the speed of the object and the distance D. The embodiment of this mechanism as shown includes a high energy resolution detector or detectors 452, mounted together with an optional neutron detector 454 on a lift mechanism 454. The mounted detectors are connected via a pulley 456 to a counterweight 458 and driven by a drive 460.

Figure 24:
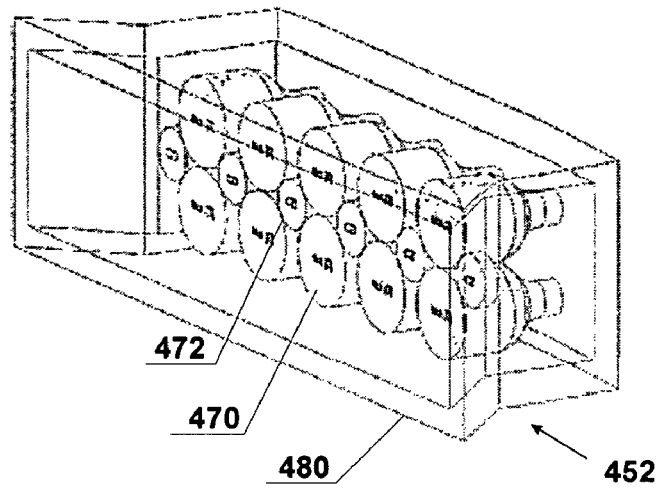
Figure 25:
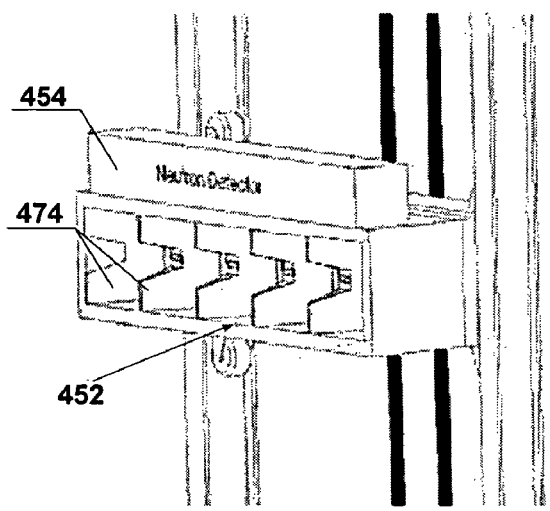
Figure 26:
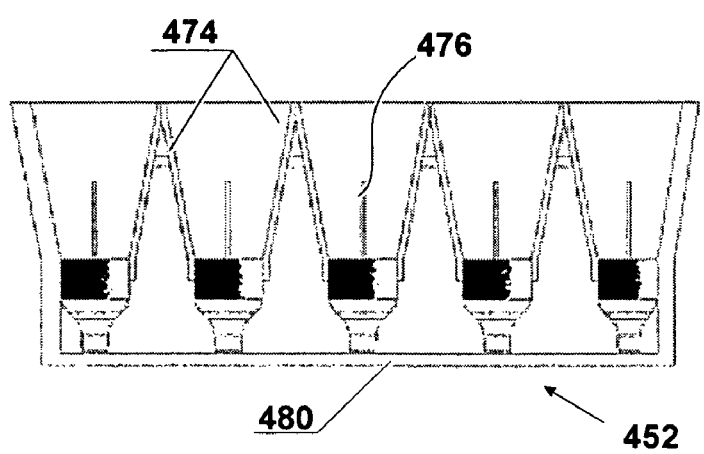

The internal structure of a preferred detector bank 452 is shown in FIGS. 24-26. As shown in FIG. 24, an NaI detector (470) bank and an optional better (energy) resolution (e.g., CZT) detectors 472 are used. Shielding 480 is provided on all sides of the bank (apart from the front window). A set of diverging (or parallel) collimators 474 are used (FIGS. 25 and 26) to optimize target to background radiation sensitivity rate. To further improve this ratio, an optional short sub-collimator 476 is placed at the centerline of each of the scintillation detectors.

The object of the high resolution (e.g., CZT) detectors is to provide in some embodiments of this invention, an option to further reduce false alarms. In the event that an alarm is set off, the object's threat level can be reassessed by bringing the detectors to a position adjacent to the threat in question location and a longer time (e.g., 1-5 minutes) premium isotope ID based on high resolution spectroscopy can be conducted.

In another preferred embodiment of this invention a further improvement of the portal performance can be achieved by the incorporation of high resolution cryogenically cooled (e.g. HG, Ge (Li) Si (Li)) solid state detectors can be used. Those detectors due to their extremely high energy resolution 200ev -2 FWHM Kev provide excellent further spectroscopy based isotope identification and suppress the effects of background and other nuclear "interference" (e.g., scatter).

As the cost and weight of these cooled detectors are high, the incorporation of the cryogenic detectors (CD) can be substantially reduced by using the "lift" and/or lateral tracking and/or tracking collimators described herein. This reduction in number and size of cryogenic detectors devices is based on the threat loci information provided by the preliminary radionuclide imaging device described above.

To further reduce the cost of ownership the use of super insulation sub system is used to reduce the power requirements of the cryogenic refrigerator and liquid Nitrogen consumption. Optionally, the detector is packaged in a vacuum based vessel with sheets of super insulation Mylar and grass supports. This reduces the cooling power requirement of the refrigerator (e.g. sterling) to less than 5 watts.

In an exemplary embodiment of the invention, the design concepts shown and described above (especially with respect to the first structure shown in FIG. 28 and subsequent figures) are implemented in pedestrian nuclear-radiological screening portals using methodology similar to these shown above. To further improve the system's performance, a metal detector (which can detect most RDD SNM and Metal Radiation Shielding "container") is incorporated to improve the threat delectability score for the portal. Alternatively or additionally, an eddy current detector can be incorporated. Such a device which preferably uses multi-frequency, eddy current metal identification regimen based preferably on "skin effect" eddy current losses can detect most SNM, RDD and shielding materials, thus further improving the portals' detection and throughput performance.

In another preferred embodiment of this invention the methods described in the previous embodiment (pedestrian portal) is embodied in a luggage, parcel or package screening belt-based portal that can further utilize the benefits of this invention. Furthermore, the incorporation of package reader ID device (e.g., bar code reader, RFID reader) can further improve the luggage and parcel portal's detection performance, by identifying the scanning results with a particular package.

In an exemplary embodiment of the invention a vehicle (e.g., truck, car) or train portal can be provided, based on the principles and detailed description as described above. This can be further improved by the incorporation of a bill of lading manifest information, "trusted shipper" info and video surveillance. All these auxiliary devices have a potential to improve threat delectability and checkpoint throughput.

Alternatively or additionally, acoustic absorption (attenuation) of some threats and shielding is used to further refine the detection of threats, especially in package and parcel detection. Acoustic wave attenuation depends (among other parameters) on the ratio between the material's specific mass and its "Young's modulus". Lead has one of the highest ratios in nature. Concrete, also used for effective shielding, has a high ratio. As such, the transmission of an acoustic wave (e.g., 25-50 cycle/sec) using a transmitting transducer (e.g., a tweeter loudspeaker) and a receiving microphone can provide a probability (P number) for the existence of lead shielding in the object screened.

Drawings showing the utilization of the invention for personnel, package and vehicle screening are shown in FIGS. 32-39 of the above referenced provisional application 60/654, 964.

In all embodiments shown and/or above, the threat location image is optionally displayed in overlap with a video image of the item screened. This can be implemented by first a video capture of the object screened and overlapping it (e.g., in an overlay mode scaled to the size of the threat radionuclide 2d image). A fused radionuclide and video (CCTV) or still image is a strong tool to improve alarm selectivity between real threats and benign sources.

Single Detector for 2D Image Forming

In many embodiments, to improve the cost performance of the high spatial resolution detector 2D imager, the introduction of single plastic scintillators can be implemented.

Figure 27:
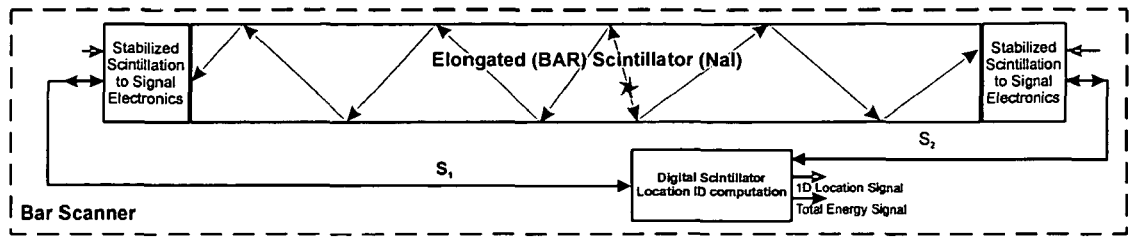
FIG. 27 is a schematic illustration of a bar shaped scanner, in accordance with an embodiment of the invention.

To overcome the cost/performance limitation of multi crystals scanners, using single scintillator devices has been proposed in the past in nuclear medicine and nuclear medicine scanning (using NaI crystals). Such a device is shown as bar scintillator 500, in FIG. 27. In this detector an elongate bar 502 of NaI scintillator material has stabilized scintillation to signal electronics converters 504 mounted on each end. A scintillation 506 in the bar causes light to travel to both of the converters 504 and to cause them to generate appropriate signals. A computation module 508 receives and compares the signals and, based on the area (energy) of the signals and the delay between them, calculates the location of the event, along the long dimension of the bar. If and when the function is non-linear a lookup table can be used to ascertain the exact location. Such a LUT is optionally factory generated by the application of a calibration process.

Figure 28:
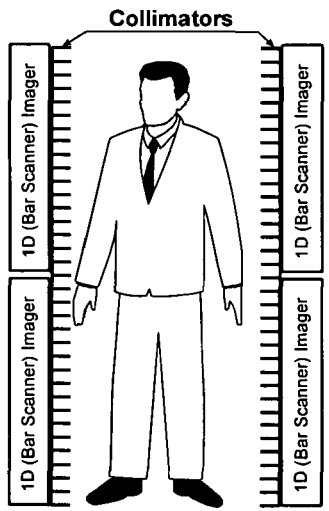
FIGS. 28 and 29 illustrate bar shaped scanner based pedestrian nuclear/radiological portal detectors arrangements, in accordance with an embodiment of the invention.
Figure 29:
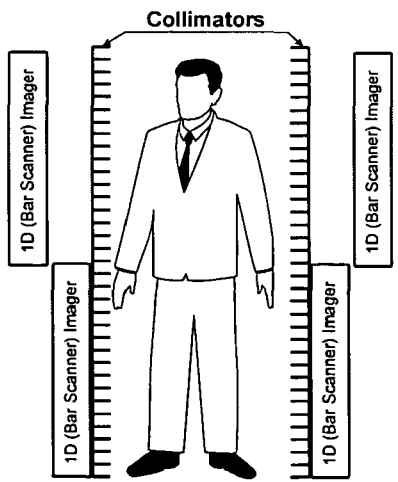

The inventor believes that such a NaI detector, which would be very expensive if used for screening, is impractical for such use. In the present invention, organic plastic scintillators are preferred, due to their superior cost/performance. As seen in FIG. 28, such a device can improve the cost/performance of nuc/rad portals. The two adjacent "bar scanners" have a dead spot between the bars which can be alleviated by displacing adjacent "bar detectors" as shown in FIG. 29. Similar structures can be provided for vehicle or train scanners.

Figure 30:
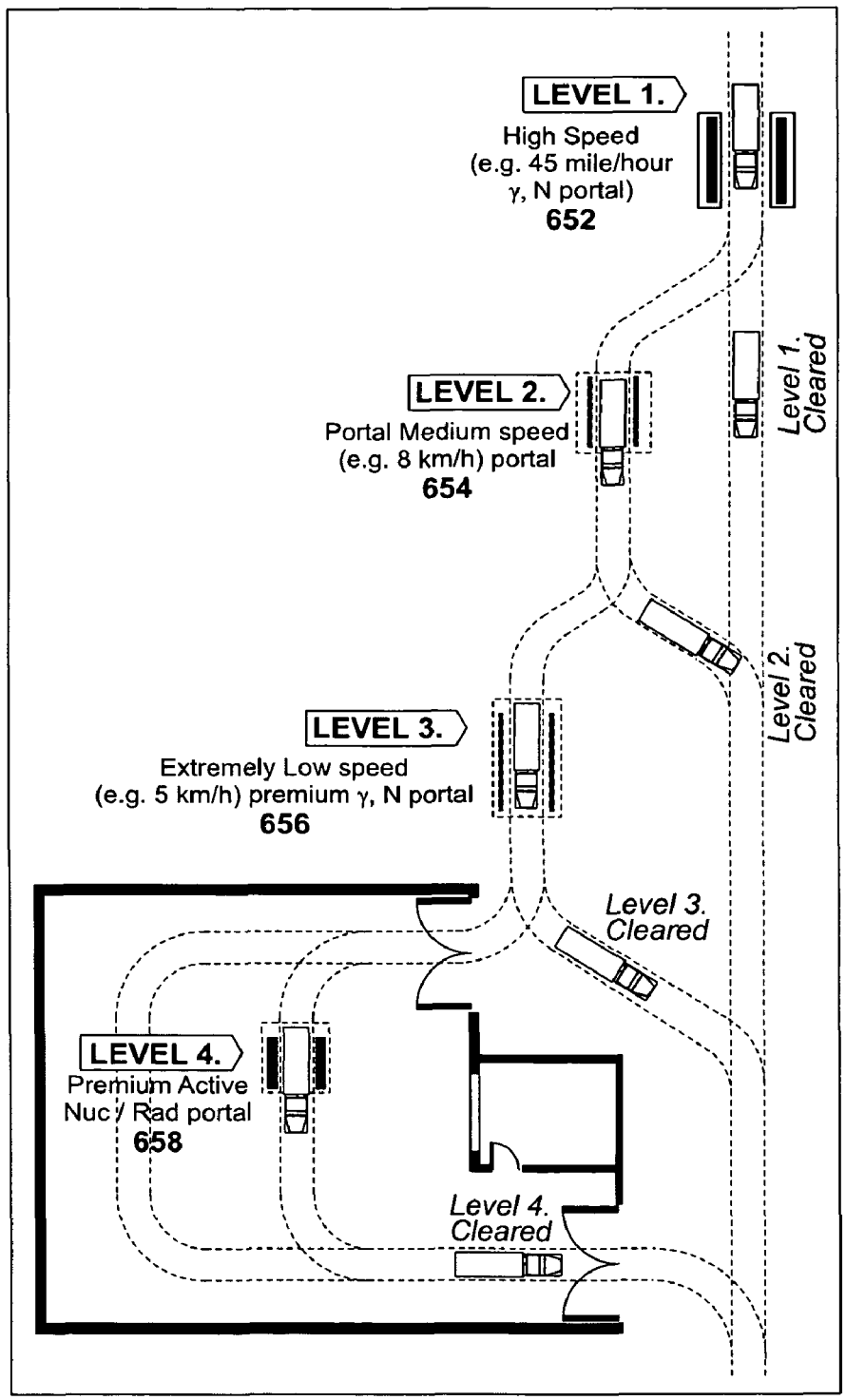
FIG. 30 illustrates a vehicle multi-tier staggered nuclear radiological portals checkpoint, in accordance with an embodiment of the invention.

In an embodiment of the invention, a multi tiered check point 650, shown schematically in FIG. 30 is provided. This multi-tiered approach is especially useful in roads with a high rate of traffic and at checkpoints where a high throughput of objects takes place. While, in FIG. 30, only vehicles are shown this concept is also relevant to other screened objects such as pedestrians, packages, luggage, cargo and mail.

The principle of this method is to provide, in a step by step staggered fashion, clearance to "objects" that exhibit a reliable (no alarm) negative probability while diverting suspect objects to a next Nuclear Radiological Screening Portal which conducts a more reliable (as well as slow and costly) screening functionality.

This provides a more efficient throughput without a sacrifice of (true) nuc/rad threat detection reliability. As shown in FIG. 30 a first Nuclear Radiological Screening Portal 652 is highly sensitive (and may not need to include imaging) portal which classifies objects without any radiation as having a relatively high object velocity (e.g. 45 miles/hour). Those objects (e.g. trucks or other vehicles) that cast a suspicion at portal 652, are diverted to a better performance (and higher cost) 2nd Nuclear Radiological Screening Portal 654 which may "clear" the vehicle or divert it to a 3rd Nuclear Radiological Screening Portal 656. Portal 656 performs a more scrutinized screening. A vehicle that is still suspicious after portal 656 suspected alarm object is diverted to a final Nuclear Radiological Screening Portal 658 in which extremely high reliability examination can be done by using one or more of the following procedures:

1. The use of an "Active Radiation" Portal (e.g. Neutron or Gamma Activation).
2. Use of hand held nuclear detection device preferably having an incorporated nuclear spectrometer.
3. The cargo can be hand searched with the aid of hand-help radiation detection device.

In another embodiment of this invention the screening of "objects" (e.g. parcels, pedestrians, mail, cargo, vehicles, containers) is performed in a 2 or 3 stage staggering to improve throughput and threat detection. The staggered approach allows a low cost portal to clear most of the "no threat" items and direct those items to a more scrutinized screening portal. To further improve the cost/performance of the Nuclear Radiological Screening Portal the advanced screening portal may include other technologies, that complement and improve the RDD/SNM detection. These can include for example explosives detectors that may detect the explosives of an RDD or nuclear device imaging systems or devices which further detect the RDD/SNM high Z materials and other non nuclear radiological threats such as explosives, weapons, and bio-chemical agents. Some structural illustrations of such systems and portals are shown in FIGS. 56-63 of the above reference provisional application 60/654, 964 and the explanations of these Figs. given therein. It should be noted that provision of a multi-threat portal on one platform can dramatically improve the cost/performance of anti terror screening portals.

Furthermore, due to the fact that most threats (RDD/SNM) are a quasi point source the application of "coded aperture"

collimation and related image reconstruction can further improve the Nuclear Radiological Screening Portal performance.

Figure 31:
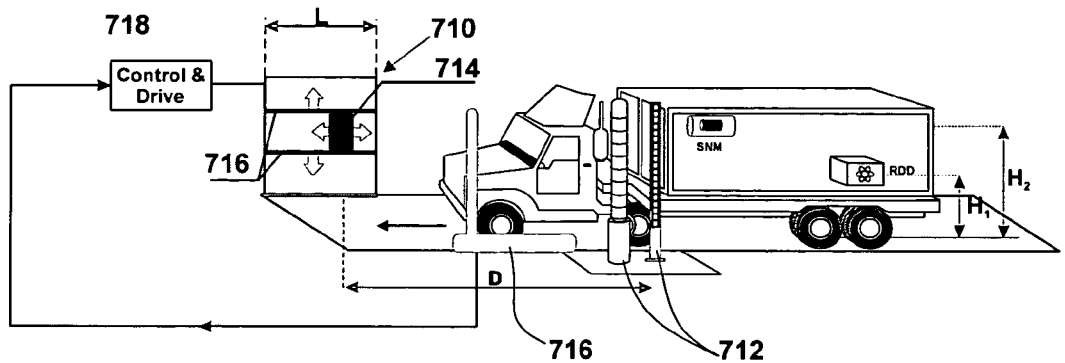
FIG. 31 illustrates a portal having high sensitivity imaging and/or spectroscopic detection with horizontal & lateral moving detectors, in accordance with an embodiment of the invention.

In another preferred embodiment of this invention, a Nuclear Radiological Screening Portal cost/performance improvement is achieved by using an "object tracking" lateral (horizontal) moving detection means 710, shown in FIG. 31. A detector (or detector bank) 714 tracks the screened item or the loci of the threat if and when it has been detected by a pre scanner 712, position sensors 716 provide the lateral position of the "item." This data is fed into the lateral moving detectors assembly 717 via an electronic control and drive sub unit 718, so that it tracks the threat.

Figure 32:
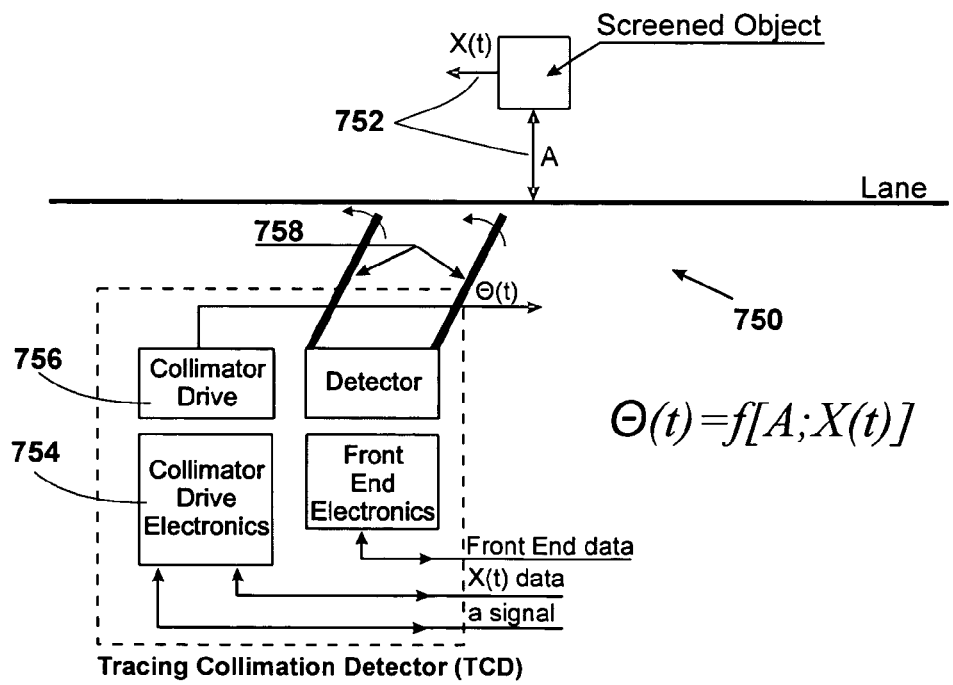
FIG. 32 illustrates sensitivity enhancement using a "tracking" collimator, in accordance with an embodiment of the invention.

Another type of tracking detector 750 is shown in FIG. 32.

In this embodiment of the invention, the location of the suspect object 752 (e.g. pedestrian, a quasi point source in a container) is tracked by an electronic tracking subsystem (not shown). The location of the threat object (or part thereof) is fed to a collimator drive electronics 754 which in turn operates a collimator drive 756. This drive is mechanically linked to a set of collimator(s) 758 which can provide a rotational movement which swivel (angle θ) to a direction that tracks the screened object (or threat loci part thereof). By tracking over a relatively large span of θ, improved detection efficiency is provided without the need to reduce background and scatter radiation immunity.

The Nuclear Radiological Screening Portal which uses such a lateral or rotational moving detection mean can have a better sensitivity (due to the longer radiation measuring time) and/or a reduced cost due to the reduced size and/or number of detectors.

Figure 33:
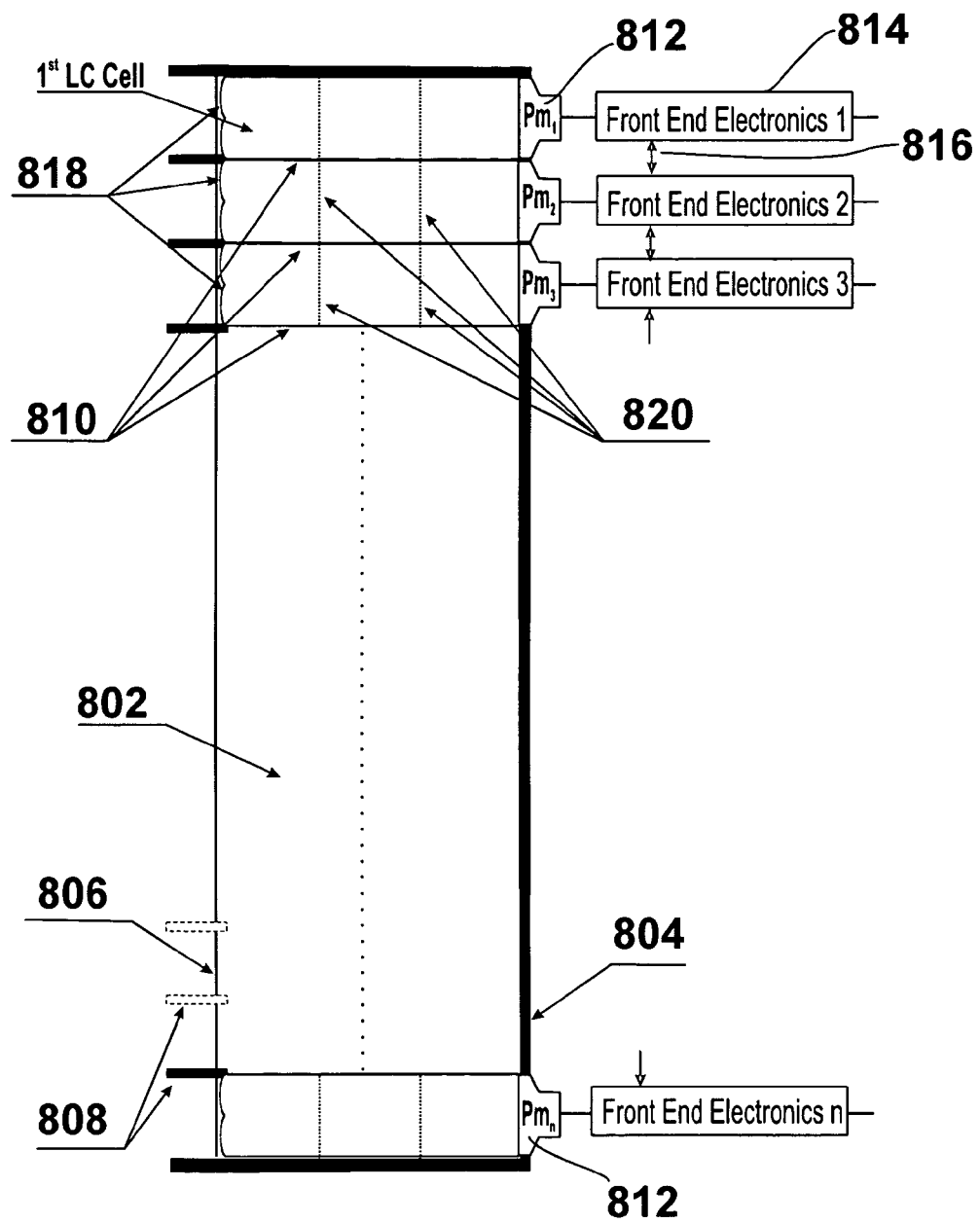
FIG. 33 is a schematic illustration of a liquid scintillator "Bar Scanner", in accordance with an embodiment of the invention.

In another preferred embodiment of this invention the Nuclear Radiological Screening Portal uses a liquid scintillator detector array 800, shown schematically in FIG. 33. The advantage of Liquid Scintillators (LS) is their fluid state which enables the use of a more efficient 2D imaging detection and/or non imaging detection with or without advanced optics. In the embodiment shown in FIG. 33, a liquid scintillator vessel 802 is contained in a 5 walls radiation shielding 804 construction with a low Z (e.g. Aluminum) radiation "window" 806 facing the front field.

A set of optional (e.g. parallel, converging, diverging) collimators 808 reject most of the background radiation and allow particles to reach the radiation window 806 and the liquid scintillator practically only from the direction in which the collimator faces. The liquid scintillator optionally includes neutron quasi cameras each surrounded by a diffuse and/or specular coated plates 810. When a gamma or neutron particle interacts with the liquid scintillator, the scintillation light photons are piped toward neutron photomultipliers 812 (one for each sub-chamber).

The photomultipliers are optically immersed in the liquid scintillators and a ring gasket provides liquid scintillator leakage protection. The photomultipliers anode pulses are processed by front end electronics 814. To improve detection efficiency, by utilizing the liquid scintillators escape quanta that escape to neighboring sub-chambers, neighboring front end channels are linked 816. By using fast coincidence windows (e.g. 15 nanoseconds) the primary quanta and the escape quanta signal are super positioned to a single signal (not shown) thus improving the energy resolution and counting statistics.

Optionally, non-imaging reflectors (as known in the art of light collectors) 818 are used to improve light collection efficiency. Alternatively or additionally, brightness enhancement films (BEF) (manufactured by the 3M company) 820 immersed in the liquid scintillator redirect some of the oblique directed light photons toward the photomultipliers.

In another preferred embodiment of this invention, the detection of Alpha and Beta emitting Isotopes is further improved by the application of the systems detectors ability to detect those charged particles (identification of the charged particles can be implemented by "pulse shape" circuitry as known in the art) or by the use of Alpha and/or Beta sensitive detectors.

In another preferred embodiment of this invention, the background radiation of high energy particles is further suppressed by the inclusion of "background sensing detectors" (BSD) which are placed between the passive shield and primary detectors. As some high energy particles will leave either a Compton signed or another signal (e.g. charged particles signal) in the background sensing detectors before the interaction with the primary detector. Those background particles will be identified by a known in the art coincidence circuit and eliminated by various ways such as a linear gate circuit.

In a novel embodiment of this concept major cost reduction can be attained especially when plastic or liquid scintillators are used (as system energy resolution can be sacrificed to reduce system cost). By using m+n light guides, the system requires only m+n photomultipliers. For example, in an 20×5 liquid scintillator array instead of using 100 photomultipliers devices and electronics only 2 photomultipliers can perform the same imaging performance (at a <30% energy resolution reduction) at a fraction of the cost.

Figure 34:
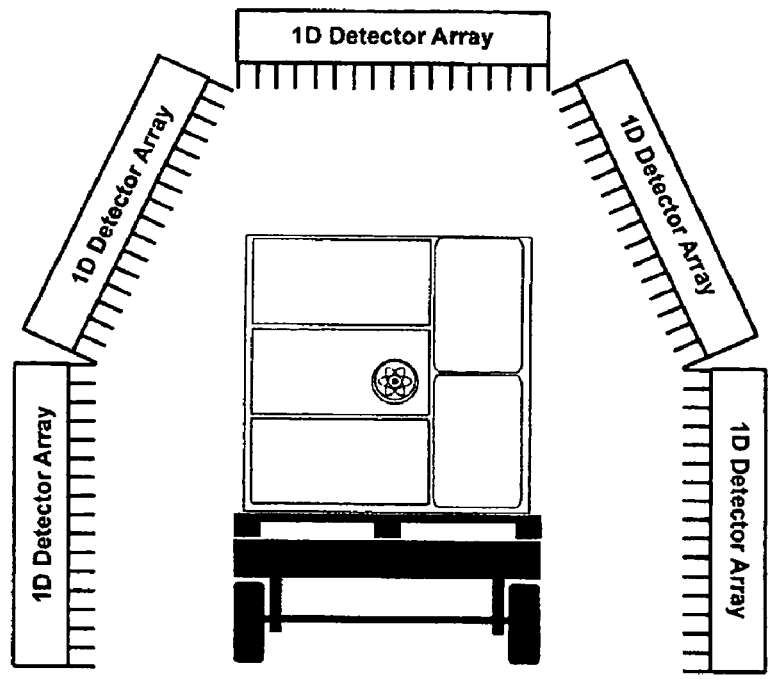
FIG. 34 is a schematic illustration of a 3D portal, in accordance with an embodiment of the invention.
Figure 35:
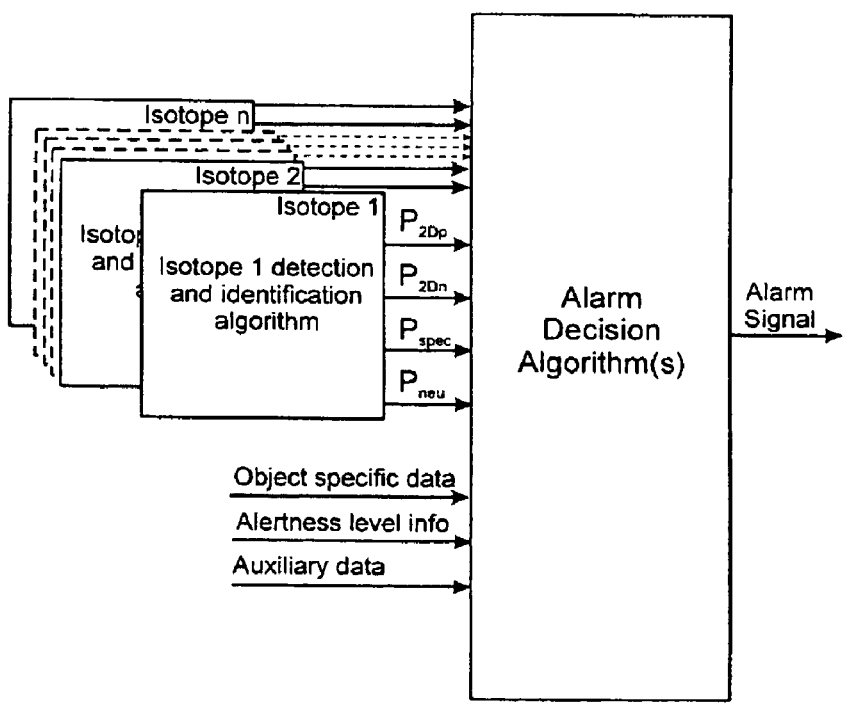
FIG. 35 illustrates a methodology for making an alarm decision, in accordance with an embodiment of the invention.

In another preferred embodiment of this invention, both 3D and 2D imaging of the radionuclide emission of the screened object can be attained at a nominal cost, further improving the delectability of threats. As seen in FIG. 34 a set of 5 linear array of collimated detectors (e.g. liquid scintillators) can, by using 5 projection provided by the 6 arrays both provide ×6 2D images and/or a 3D tomographic image of the radionuclide emission by using reconstruction algorithms used in the art of 3D reconstruction (e.g. back projection, algebraic reconstruction). The use of low cost liquid or plastic scintillators can provide a relatively high cost/performance factor.

Spectroscopy Radioisotope Identification Methods

Isotope Identification from Spectral Analysis methods is one of the elements of isotope identification. This embodiment uses more than one method for threat detection and isotope analysis that will further optimize threat detection and isotope identification:

Method 1—This method will utilize as a base package an industry-standard peak-locator algorithm such as MGA, FRAM, or TRIFID, augmented by routines that are specific to our design.

Method 2—This method may in a preferred embodiment implement machine-learning procedures that minimize the error, based on a certain parameter or condition by which the dataset is analyzed, or use another method.

Before implementing each method the pre-processing and probability assessment method procedures outlined above and shown in FIG. 19 are implemented.

Method 1

As stated, method 1 can be one of many methods. In a preferred embodiment, an MGA algorithm will be used.

In the MGA-based algorithm, a non-linear least squares method is utilized to fit each energy window for our measured spectra with a multi-peak Gaussian function with a correction for the tails. This function is similar to what is used in the classic MGA, and given by:

$$S = \sum_{i=1}^{N} S_i [\exp(\alpha_i(x_i - x)^2) + (A_i \exp(B_i x) + C_i \exp(D_i x)) \times \delta_i (1 - \exp(0.4x^2))] \quad (p.1)$$

where, $S_i$, $A_i$, $B_i$, $C_i$, $D_i$, $\alpha_i$, $\delta_i$ are fitting parameters for each "peak with tails" in the energy window chosen.

After a fitting function is produced for each window, the functions are appended and correlated against isotope ($Co^{60}$ in our example) reference data for the same set of energy windows. This is repeated for each isotope, and at the end the method outputs two vectors of $\chi^2$-coorelation agreements for both fitting functions used.

Method 2

The second method that may be used for the spectra analysis will be based (for example) on machine learning algorithms. Other spectra base algorithms (as partly listed above) can be used as algorithm 2. There are two classes of algorithms:

Clustering—These are unsupervised machine learning tools,
Classifiers—These belong to the supervised grouping. The classifiers use a reference data set called "training data", and choose from a set "learning functions" to optimize the "decision function". A binary classifier of the SVM (Support Vector Machine) type, whose solution will be the probability value that the spectra recorded was generated by our test isotope may be implemented.

A simple way to build a binary classifier is to construct a hyperplane (i.e., a plane in a space with more than three dimensions) separating class members (positive examples) from non-members (negative examples) in this space. SVM algorithms operate by mapping the given training set (the reference data for the isotope tested) into the higher-dimensional feature space and attempting to locate in that space a plane that separates the positive from the negative examples. For our case, there are reference spectra for each isotope, which will serve as training data sets. Each set will contain m examples (e.g. characteristic peaks), each of which can be represented as a vector of n numbers. These vectors may be thought of as points in an n-dimensional space. Having found a separating hyperplane, the SVM can then predict the classification of an unlabeled example, by mapping it into the feature space, and asking on which side of the plane the example lays. SVM's choose the plane that maintains a maximum margin from any point in the training set.

Formally, for isotope recognition, an attempt is made to estimate a function $f: R^N \to (\pm 1)$ using our reference training spectra, which can be expressed, for instance, as N-dimensional set of peaks $(x_i)$, and class labels $y_i$. If $f$ was chosen well, the algorithm will classify new examples (x,y) from datasets (measured spectra) that were generated from the same underlying probability distribution $P(x,y)$ with minimum error as compared with the training reference spectra. If we let $X \in R_0 \subset R^n$ be the input vector, $y \in (-1,1)$ be the labels, and $\phi: R_0 \to F$ be the mapping from input space to feature space. Then the SVM learning algorithm finds a hyperplane (w,b) such that the quantity:

$$(w \circ \phi(x)) + b = 0, w \in R^N, b \in R \quad (p.3)$$

corresponding to decision functions:

$$f(x) = \text{sign}((w \circ \phi(x)) + b) \quad (p.4)$$

Given the above conditions, one can show that the optimal hyperplane, is defined as the one with the maximal margin of separation between the two classes. This means that (p.4) can be easily rewritten as:

$$f(x) = \text{sign}\left(\sum_i \alpha_i y_i \langle \phi(x_i), \phi(x) \rangle - b\right) \quad (p.5)$$

where the $\alpha_i$ are defined according to $\Sigma \alpha_i y_i = 0, \alpha_i > 0$. Therefore, the decision function for classifying points with respect to the hyperplane only involves dot products between points in the feature space. Because the algorithm finds a separating hyperplane in the feature space can be stated entirely in terms of vectors in the input space and dot products in the feature space, a support vector machine can locate the hyperplane without ever representing the space explicitly, simply by defining a function, called a kernel function, that plays the role of the dot product in the feature space. Finally, the decision function can then be expressed as a linear set of functions that is defined by a kernel K, according to:

$$f(x) = \text{sign}\left(\sum_i \sum_j \alpha_i y_i K_{ij}(x_j \cdot x) - b\right) \quad (p.6)$$

The SVM algorithm will calculate decision functions for all the isotopes training data, and output a vector of values corresponding to the degree of agreement in the classification of the measured spectra to the decision functions for each of the reference training sets. Classifier algorithms can be tuned to minimize the statistical error in making a statistical decision, and are therefore often superior to standard statistical approaches that utilize least squares fitting methods.

Alarm Decision Method Design

In the process of scanning a screened object (see FIG. 35), all the main channels (see FIG. 19) are considered with appropriate weighting in order to make a proper threat assessment. In a preferred embodiment, several sources are used as an input for example as described with respect to FIG. 19.

Once all the individual isotopes (or sub group of isotopes) "detection & classification methods" have been performed (note that isotopes can be also assessed by a group of isotopes detection methods). The P (Probability) numbers of each isotope (or isotopes sub groups) is fed into the alarm decision method. Optionally this method is fed by other relevant information such as national or local alarm level, trusted (or suspected) item data and other data like manifest data for container of pedestrian profile or CAPP data. This data can be fed into the alarm decision method to elevate or reduce its threshold levels.

To make the proper assessment, one can utilize concepts from decision theory. In this context, it is desirable to optimize the decision method, such that the ramifications of overlooked-threats (false negatives) is much higher than false-detections (false positives). The decision method is constructed as a two-gate analysis (see sample logic tree-truth tables Table 8) where the input from both imaging channels correspond to the input of gate 1. The output from gate 1 is then used with the spectral-analysis results as the input for gate 2. The output of gate 2 will issue a warning signal ranging from A to D: where A (p<5%) corresponds to: "isotope N is not the source of the 2D image or spectra", B (5%<p<75%) corresponds to: "There is a low probability for the presence of isotope N as a source of local radiation"—in this case issue a low alert, C (75%<p<95%) corresponds to: "There is a high probability for the presence of isotope N as a source for the local radiation"—in this case issue a strong alert, and D(p>95%) corresponds to: "There is a definitive identification of isotope N as the source of radiation". It is understood that this paragraph describes an exemplary method and is not meant to define any requirement of the invention.

Since the method can be independently run for every isotope, one isotope (or a plurality) at a time, one can expect an output that is a vector of the probability for the presence of each threat. This will enable us to recognize more than one threat with differing risk values. Moreover, an object will be cleared iff (if and only if) the decision method's output vector will be given values of A all threat isotopes.

In accordance with decision theory, and the need to minimize missed-detections, if at least one isotope is issued a risk value B, a low alert will be issued and at this point the system's supervisor may consider one of several decision support options, such as visually examining the 2-d image (available automatically), or a retest of the object for a time extended spectra measurement. If at least one (non NORM) isotope is issued a risk value of C, a high alert will be issued which means that the supervisor will now have to choose from a more stringent set of protocols in deciding what to do with the vehicle. Finally, if at least one isotope will be issued with a risk value D, corresponding to definitive identification, an alarm will be issued.

Note, that this invention, in some embodiments thereof, allows for flexibility in the decision tree, such that such that national alert level conditions can be factored into the consideration by making the logic more sensitive to missed-detections and vice-versa. In addition, by having the ability to collect all the data from the various portals, the method will be able to generate a "history-of-decisions" function, which may alter the weighing function used to assess the contribution of each channel (2D Image, spectra, etc.) to the decision making process. This will provide further performance optimization of this process after a certain elapsed time, thereby upgrading the detection capability.

For the isotopes known as NORM, an additional gate can be implemented (gate 3), which will produce an output for the probability of which NORM isotope is the cause of the detected radiation.

TABLE 8

Sample Logic Tree for $Co^{60}$ - Delectability Truth Tables

| Gate 1 2D Composite | | | Gate 2 Isotope ID | | | Gate 3 NORM | | |
|---|---|---|---|---|---|---|---|---|
| PS | NaI | 2D-composite | 2D-composite | spectra | Isotope ID | 2-D composite | spectra | Isotope ID |
| 0 | 0 | A | A | 0 | A | A | 0 | 0 |
| 0 | 1 | B | A | 1 | A | A | 1 | 1 |
| 0 | 2 | B | A | 2 | A | A | 2 | 2 |
| 1 | 0 | B | B | 0 | A | B | 0 | 0 |
| 1 | 1 | C | B | 1 | B | B | 1 | 0 |
| 1 | 2 | C | B | 2 | B | B | 2 | 0 |
| 2 | 0 | C | C | 0 | A | C | 0 | 0 |
| 2 | 1 | C | C | 1 | B | C | 1 | 0 |
| 2 | 2 | D | C | 2 | C | C | 2 | 0 |
| | | | D | 0 | B | D | 0 | 0 |
| | | | D | 1 | C | D | 1 | 0 |
| | | | D | 2 | D | D | 2 | 0 |

One or more Decision (Tree) Algorithms can be implemented. A list that identifies and describes some of those various algorithms is given in provisional application 60/654,964, the disclosure of which was incorporated herein by reference.

As used herein the term conveyance means a vehicle such as a car, train, truck, bus or marine conveyance.

It should be noted that the present invention is based on provisional application 60/654,964, which was edited to remove some of the reference information contained therein. The reader is referred to that application for further information as specifically referenced above and also for further details of the embodiments presented herein.

The present invention generally describes apparatuses, including portals and detectors for detecting hazardous and/or radioactive materials, and methods for signal processing, decision making and/or for using the apparatuses. It should be understood that these apparatuses and methods are adapted to be used on a variety of subjects and in a variety of settings, including people, packages, conveyances, buildings, outdoor settings, and/or indoor settings. Also, within the scope of the invention is firmware, hardware, software and computer readable-media including software which is used for carrying out and/or guiding the methodologies described herein, particularly with respect to nuclear threat detection. Hardware optionally includes a computer, the computer optionally comprising a processor, memory, storage space and software loaded thereon. The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. When used in the following claims, the terms "comprises", "includes", "have" and their conjugates mean "including but not limited to". The scope of the invention is limited only by the following claims.

The invention claimed is:

1. A method for detecting Special Nuclear Materials (SNM) or Radiological dispersion Devices (RDD), comprising:
    moving a vehicle, shipping container or trailer along a predetermined path;
    recording a two or three dimensional spatial distribution of radioactive sources that spontaneously emit gamma radiation associated with the vehicle, shipping container or trailer, as the vehicle, shipping container or trailer passes along said path; and
    determining the presence and location of one or both of an RDD or SNM within the vehicle, shipping container or trailer from said distribution,
    wherein recording comprises utilizing an imaging detector or detectors having an energy resolution FWHM of <28% for $Cs^{137}$ without relative vertical movement thereof to image said radiation sources over the vehicle, shipping container or trailer.

2. A method according to claim 1 and further comprising:
    determining at least one energy spectral characteristic of the spontaneously emitted radiation; and
    classifying a source as benign or as a potentially illicit radioactive material, based on one or both of its determined presence and location within the vehicle, shipping container or trailer and its determined spectral characteristic.

3. A method according to claim 2 wherein determining the spectral characteristic comprises determining said characteristic responsive to the determination of location of the radioactive source.

4. A method according to claim 3 wherein an identification of radioactive threats and/or benign sources is based on data fusing of said location characteristic and said at least one energy spectral characteristic.

5. A method according to claim 2 wherein:
determining the spectral characteristic comprises acquiring radiation using a second detector that is separate from an imaging detector used to form the distribution of radioactive sources, said second detector having a better energy resolution than the imaging detector.

6. A method according to claim 5 wherein the imaging detector is located at a first point along the path and wherein the second detector is located further down the path.

7. A method according to claim 6 and including adjusting a field of view of the second detector responsive to the determined location.

8. A method according to claim 7 wherein adjusting the field of view comprises adjusting a location of the second detector.

9. A method according to claim 7 wherein adjusting a field of view comprises adjusting an angle of one or more collimator septa of the second detector.

10. A method according to claim 2 and including:
determining the presence of quasi-point sources in the distribution, wherein classifying the source as a likely to be illicit nuclear material comprises classifying responsive to whether the source is a quasi-point source.

11. A method according to claim 10 wherein at least a fraction of gamma particles associated with a quasi-point source loci is used to determine the spectral characteristic of the point source.

12. A method according to claim 2 and including identifying at least one isotope of said source based on the at least one spectral characteristic.

13. A method according to claim 2 and including acquiring an electronic visual image of the vehicle, shipping container or trailer.

14. A method according to claim 13 and including utilizing the location of the radioactive sources within the visual image of the vehicle, shipping container or trailer to classify the source as potentially benign or potentially illicit.

15. A method according to claim 2 wherein classifying comprises separately determining the presence of a plurality of threat isotopes, utilizing different criteria for said determinations.

16. A method according to claim 1 wherein recording also comprises recording the spatial distribution of neutron sources.

17. A method according to claim 1 and including:
determining the presence of radioactive quasi-point sources in the spatial distribution, and classifying the source as likely to be illicit nuclear material responsive to whether the source is a quasi-point source.

18. A method according to claim 1 wherein the vehicle, shipping container or trailer is a vehicle.

19. A method according to claim 1 wherein the vehicle, shipping container or trailer is a container.

20. A method according to claim 1 wherein recording a spatial distribution comprises:
acquiring a plurality of one dimensional spatial distributions of a passing vehicle, shipping container or trailer; and fusing the images into a two dimensional spatial distribution.

21. A method, according to claim 1 comprising:
generating first image data based on radionuclide radiation detected by a detector in the absence of any threats;
generating second image data based on nuclear radiation detected by the detector in the presence of a possible threat; and
adjusting the at least one second image data based on the at least one first image.

22. A method according to claim 21 wherein said threats include one or more of RDD and SNM.

23. A method according to claim 21 wherein the first and second images are images of a neutron distribution.

24. A method according to claim 21 wherein the first and second images represent a spatial distribution of gamma particles.

25. A method according to claim 21 and including:
determining the presence of a threat responsive to the adjusted second image.

26. Apparatus according to claim 1 wherein the detector has an energy resolution FWHM of <30% for $Co^{60}$.

27. Apparatus for detecting Special Nuclear Materials (SNM) or Radiological dispersion Devices (RDD) from an object comprising:
at least one detector having an energy resolution FWHM of <28% for $Cs^{137}$, operative and configured to detect spontaneous radiation emanating from at least RDD and SNM associated with an object passing along a predetermined path and to form a two or greater dimensional image output based on the detected spontaneous radiation; and
a controller configured to receive the image output and to determine the presence and location of a radioactive source or sources within the object from the detected spontaneous nuclear radiation,
wherein the at least one detector is stationary and is large enough to image the entire height of a vehicle shipping container or trailer.

28. Apparatus according to claim 27 wherein the at least one same detector is also operative to generate spectral energy information on at least RDD and SNM radionuclide sources.

29. Apparatus according to claim 28 wherein the controller is operative and configured to receive the spectral energy information and determine whether the radioactive source is a benign or threat source based on the image data and on the spectral energy information.

30. Apparatus according to claim 27 wherein the at least one detector comprises:
at least one imaging detector that produces a spatial image of the spontaneously radiating radioactive sources; and
at least one spectral energy detector that determines energy information from spontaneous gamma radiation at the determined location.

31. Apparatus according to claim 30 wherein the controller is operative to receive the spectral information and determine whether the radioactive source is a benign or threat source based on the image data and on the spectral information.

32. Apparatus according to claim 30, wherein the at least one imaging detector has a first field of view and wherein the at least one spectral detector has a second field of view and wherein the first and second fields of view are arranged such that an object can pass from the imaging detector to the spectral energy detectors as it passes along the predetermined path.

33. Apparatus according to claim 32 wherein the controller controls the second field of view such that the second field of view includes the detected source, wherein the second field of view is smaller than the first field of view.

34. Apparatus according to claim 33 wherein the spectral detector is movable and wherein the controller translates the spectral detector to include the detected source in the second field of view.

35. Apparatus according to claim 34 wherein the controller determines a height of the source and adjusts the height of the spectroscopic detector responsive to the determined height.

36. Apparatus according to claim 35 wherein the controller determines a position of the source along the path and wherein the spectroscopic detector is translated in a direction parallel to the path to keep the source in the second field of view as the source travels along the path.

37. Apparatus according to claim 36 and including a velocity detector that determines a velocity of the object and wherein the controller utilizes the velocity to keep the source in the second field of view as the source travels.

38. Apparatus according to claim 33 wherein the spectroscopic detector comprises a collimator having septa that define the second field of view and wherein the controller controls an angle of the septa such that the second field of view includes the source as the object passes the spectroscopic detector.

39. Apparatus according to claim 32 wherein the at least one imaging detector comprises an organic scintillator.

40. Apparatus according to claim 39 wherein the organic scintillator is a liquid scintillator.

41. Apparatus according to claim 27 wherein at one detector of the at least one detector is sensitive to neutrons and wherein the image is an image of a neutron source.

42. Apparatus according to claim 27 wherein the detector is a two dimensional detector.

43. Apparatus according to claim 27 wherein the image formed is a two dimensional image.

44. Apparatus according to claim 27 wherein the detector has an energy resolution FWHM of <30% for $Co^{60}$.

45. Apparatus for radioactive emission tomographic imaging of a moving item to be screened, comprising:
   a plurality of nuclear imaging detectors having an energy resolution FWHM of <28% for $Cs^{137}$, placed around the axis of a path suitable for passage of a moving item, the detectors being operative to detect and image gamma radiation spontaneously emitted from at least some RDD and SNM sources; and
   a controller that receives signals from the nuclear imaging detectors and forms a tomographic image of sources of spontaneously emitted radiation associated with the screened item.

46. Apparatus according to claim 45 wherein the controller receives a plurality of sets of signals from the detectors as a screened item passes along the path and derives a three dimensional tomographic distribution of radionuclide sources emitting spontaneous radiation associated with the item.

47. A method for determining a nuclear threat associated with a conveyance, comprising:
   (a) detecting spontaneous nuclear emissions from the conveyance at a first detection station;
   (b) determining conveyances that do not pose a threat according to a first criterion responsive to the spontaneous emissions detected at the first detection station;
   (c) directing conveyances that contain potential threats according to the first criteria to a second detection station and releasing conveyances that do not meet the first criterion;
   (d) detecting spontaneous nuclear emissions from the conveyance at the second detection station;
   (e) determining conveyances that do not pose a threat according to a second criterion responsive to the emissions detected at the second detection station;
   (f) directing vehicles that contain potential threats according to the second criterion to a third station for further inspection; and
   (g) releasing conveyances that do not contain potential threats according to any of the criteria, without further testing,
   wherein detecting in at least one of a) or d) utilizes an apparatus according to claim 45.

48. A method according to claim 47 and including:
   repeating at least (d) and (e) at least once for respective additional detection stations prior to (f).

49. Apparatus according to claim 47 wherein detection of spontaneous nuclear emission in at least one of (a) and (d) includes mapping of the spontaneous emission.

50. Apparatus according to claim 47 wherein detection of spontaneous nuclear emission in both of (a) and (d) includes mapping of the spontaneous emission.

51. Apparatus according to claim 45 wherein the detector has an energy resolution FWHM of <30% for $Co^{60}$.

* * * * *